(12) United States Patent
Hanioka et al.

(10) Patent No.: US 10,855,173 B2
(45) Date of Patent: Dec. 1, 2020

(54) POWER CONVERSION DEVICE

(71) Applicant: Mitsubishi Electric Corporation, Chiyoda-ku (JP)

(72) Inventors: Shota Hanioka, Chiyoda-ku (JP); Masahiro Iezawa, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/492,495

(22) PCT Filed: May 9, 2017

(86) PCT No.: PCT/JP2017/017500
§ 371 (c)(1),
(2) Date: Sep. 9, 2019

(87) PCT Pub. No.: WO2018/207249
PCT Pub. Date: Nov. 15, 2018

(65) Prior Publication Data
US 2020/0274442 A1 Aug. 27, 2020

(51) Int. Cl.
*H02M 1/44* (2007.01)
*H02M 3/157* (2006.01)
(Continued)

(52) U.S. Cl.
CPC ............. *H02M 1/44* (2013.01); *H02M 3/157* (2013.01); *H02M 7/53873* (2013.01); *H02M 2001/0012* (2013.01)

(58) Field of Classification Search
CPC .... H02M 1/44; H02M 3/157; H02M 7/53873; H02M 2001/0012
See application file for complete search history.

(56) References Cited

U.S. PATENT DOCUMENTS

2007/0290894 A1* 12/2007 Ng .................. H02M 3/157
341/50
2012/0314461 A1 12/2012 Yoshikawa et al.
(Continued)

FOREIGN PATENT DOCUMENTS

JP 5473079 B2 4/2014
JP 2016-54581 A 4/2016

OTHER PUBLICATIONS

International Search Report dated Jul. 11, 2017 in PCT/JP2017/017500 filed May 9, 2017.
(Continued)

*Primary Examiner* — Jue Zhang
(74) *Attorney, Agent, or Firm* — Xsensus LLP

(57) ABSTRACT

A control device for controlling switching elements in a power conversion circuit includes a pattern generation unit for generating a frequency change pattern, and a controller. Using n first frequencies fc and a second frequency fdef smaller than the smallest one of differences between the n first frequencies fc, the pattern generation unit determines a shift order of the 2n switching frequencies f determined by adding/subtracting the second frequency fdef to/from the first frequencies fc, such that the middle value between two switching frequencies f before and after shifting does not overlap the value of each switching frequency f, thereby generating a frequency change pattern. The controller generates a control signal G for each switching element by using the 2n switching frequencies f for respective different duration times in accordance with the frequency change pattern.

20 Claims, 23 Drawing Sheets

(51) Int. Cl.
*H02M 7/5387* (2007.01)
*H02M 1/00* (2006.01)

(56) References Cited

U.S. PATENT DOCUMENTS

| | | | |
|---|---|---|---|
| 2014/0159686 A1* | 6/2014 | Lee | H02M 3/156 323/282 |
| 2015/0232029 A1* | 8/2015 | Grandy | H02M 1/44 348/148 |
| 2015/0244269 A1* | 8/2015 | Yu | H02M 1/44 323/284 |
| 2015/0349639 A1* | 12/2015 | Hosoyama | H02M 3/156 323/271 |
| 2016/0006350 A1* | 1/2016 | Matthew | H02M 3/158 323/271 |

OTHER PUBLICATIONS

Stone, D. A. et al., "Easing EMC problems in switched mode power converters by random modulation of the PWM carrier frequency," IEEE Proceeding of Applied Power Electronics Conference. APEC., vol. 1, Mar. 1996, pp. 327-332.

* cited by examiner

FIG. 22
(a) fmid: 9kHz
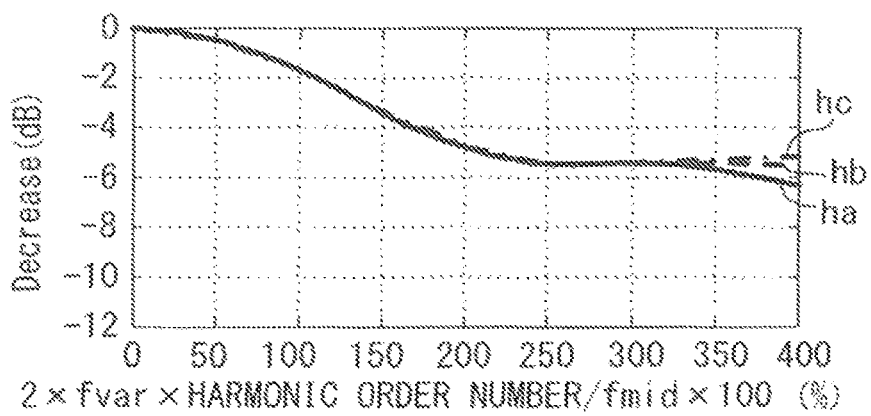
(b) fmid: 12kHz
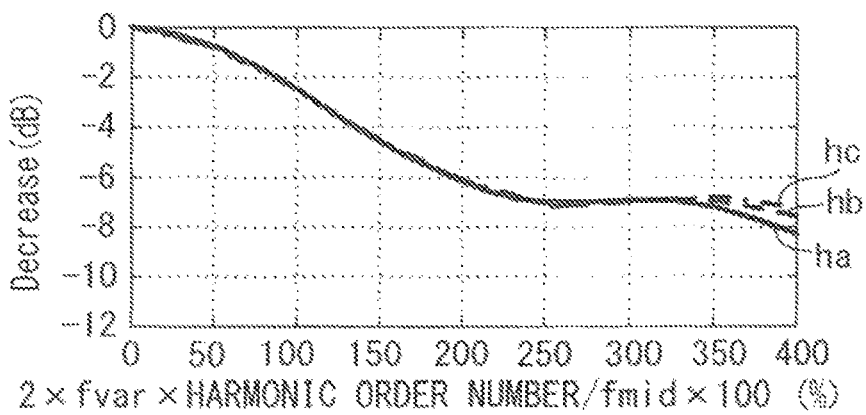
(c) fmid: 15kHz
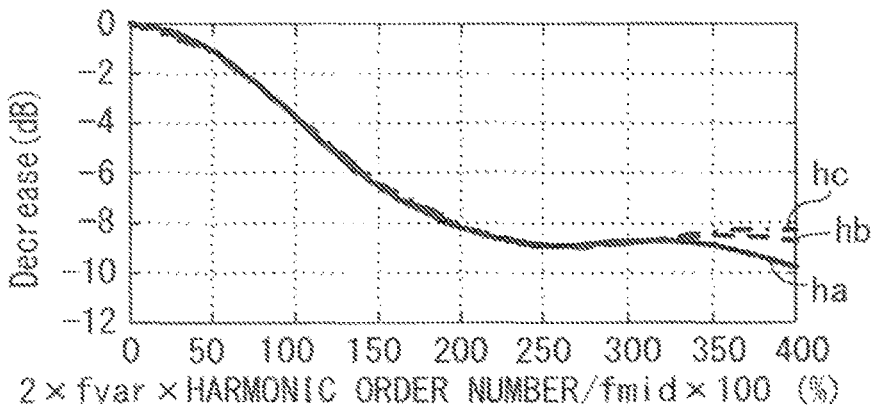
(d) fmid: 18kHz
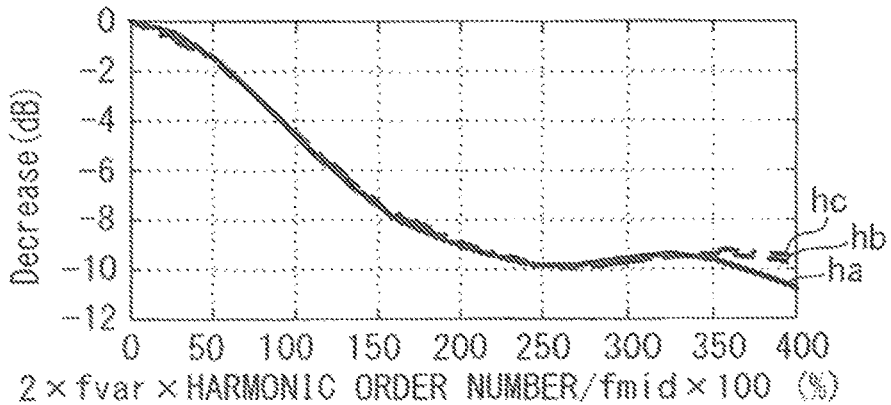

POWER CONVERSION DEVICE

TECHNICAL FIELD

The present invention relates to a power conversion device including switching elements, and in particular, a switching frequency for controlling the switching elements.

BACKGROUND ART

In a power converter that performs power conversion through switching operations of turning on/off switching elements, when switching control is performed at a certain switching frequency, electromagnetic noise with certain frequency components and harmonic components thereof occurs.

Electromagnetic noise standards are prescribed on a product classification basis. Therefore, in the case where electromagnetic noise occurring in a power converter exceeds the standard, it is required to take measures therefor. In general, it is conceivable that a component for coping with the noise, such as noise filter, is provided. However, this leads to size increase of the device configuration and increase in the cost.

In order to solve the above problem, a conventional power conversion device includes a frequency changing device for repeatedly outputting a frequency change pattern including a plurality of frequency values, and a controller for performing ON/OFF control of switching elements with a switching frequency according to the frequency change pattern (see, for example, Patent Document 1).

In another example of conventional power conversion devices, the switching frequency is dispersed in accordance with a switching frequency dispersion pattern obtained by combining a main dispersion pattern in which a basic pattern prescribing a plurality of frequencies with respect to time is repeated every repetition time, and a sub dispersion pattern in which the frequency is switched every repetition time and the interval between the adjacent frequencies is smaller than that in the main dispersion pattern (see, for example, Patent Document 2).

CITATION LIST

Patent Document

Patent Document 1: Japanese Laid-Open Patent Publication No. 2016-54581
Patent Document 2: Japanese Patent No. 5473079

SUMMARY OF THE INVENTION

Problems to be Solved by the Invention

In the above power conversion devices, electromagnetic noise is decreased using a plurality of switching frequencies. However, depending on a frequency band, in particular, in an amplitude modulation (AM) band, it is necessary to increase the variation width of the switching frequency in order to obtain a sufficient noise decreasing effect. This causes a problem of increasing the load of calculation processing in high-frequency switching control.

In addition, the power conversion device described in Patent Document 2 changes the switching frequency among a plurality of switching frequencies at equal time intervals. Therefore, in consideration of suppression for current ripple at the time of the changing, the duration time for each switching frequency is sometimes excessively prolonged.

The present invention has been made to solve the above problem, and an object of the present invention is to provide a power conversion device in which increase in the variation width of the switching frequency is suppressed in switching control using a plurality of switching frequencies, and the duration time for each switching frequency is prevented from being excessively prolonged, thereby enabling electromagnetic noise to be effectively decreased over a wide frequency band.

Solution to the Problems

A power conversion device according to the present invention includes: a power conversion circuit which has a switching element and which performs power conversion of input power through switching operation of the switching element and outputs resultant power; and a control device for controlling the power conversion circuit. The control device includes: a pattern generation unit for generating a frequency change pattern in which 2n switching frequencies f are shifted thereamong, n being an integer equal to or greater than 2; and a controller for generating a control signal for switching the switching element, by using the 2n switching frequencies f for respective different duration times in accordance with the generated frequency change pattern. The pattern generation unit includes: a frequency determination unit which, using n first frequencies fc and a second frequency fdef smaller than a smallest one of differences among the n first frequencies fc, determines the 2n switching frequencies f which are generated by adding/subtracting the second frequency fdef to/from each first frequency fc so as to sandwich the first frequency fc; and a shift determination unit which determines a shift order of the 2n switching frequencies f so that a middle value between two switching frequencies f before and after shifting does not overlap a value of each switching frequency f. The controller uses a carrier wave having each switching frequency f as a carrier frequency and changes each carrier frequency in synchronization with upper peaks or lower peaks of the carrier wave.

Effect of the Invention

In the power conversion device according to the present invention, 2n switching frequencies f determined such that the middle value between two switching frequencies f before and after shifting does not overlap the values of the other switching frequencies f are used for respective different duration times, to perform switching control. Thus, increase in the variation width of the switching frequency is suppressed, and electromagnetic noise can be effectively decreased over a wide frequency band. In addition, the duration time of each switching frequency can be prevented from being excessively prolonged.

BRIEF DESCRIPTION OF THE DRAWINGS

FIG. 22 is a waveform diagram showing a harmonic component decrease amount according to embodiment 6 of the present invention.

DESCRIPTION OF EMBODIMENTS

Embodiment 1

Figure 1:
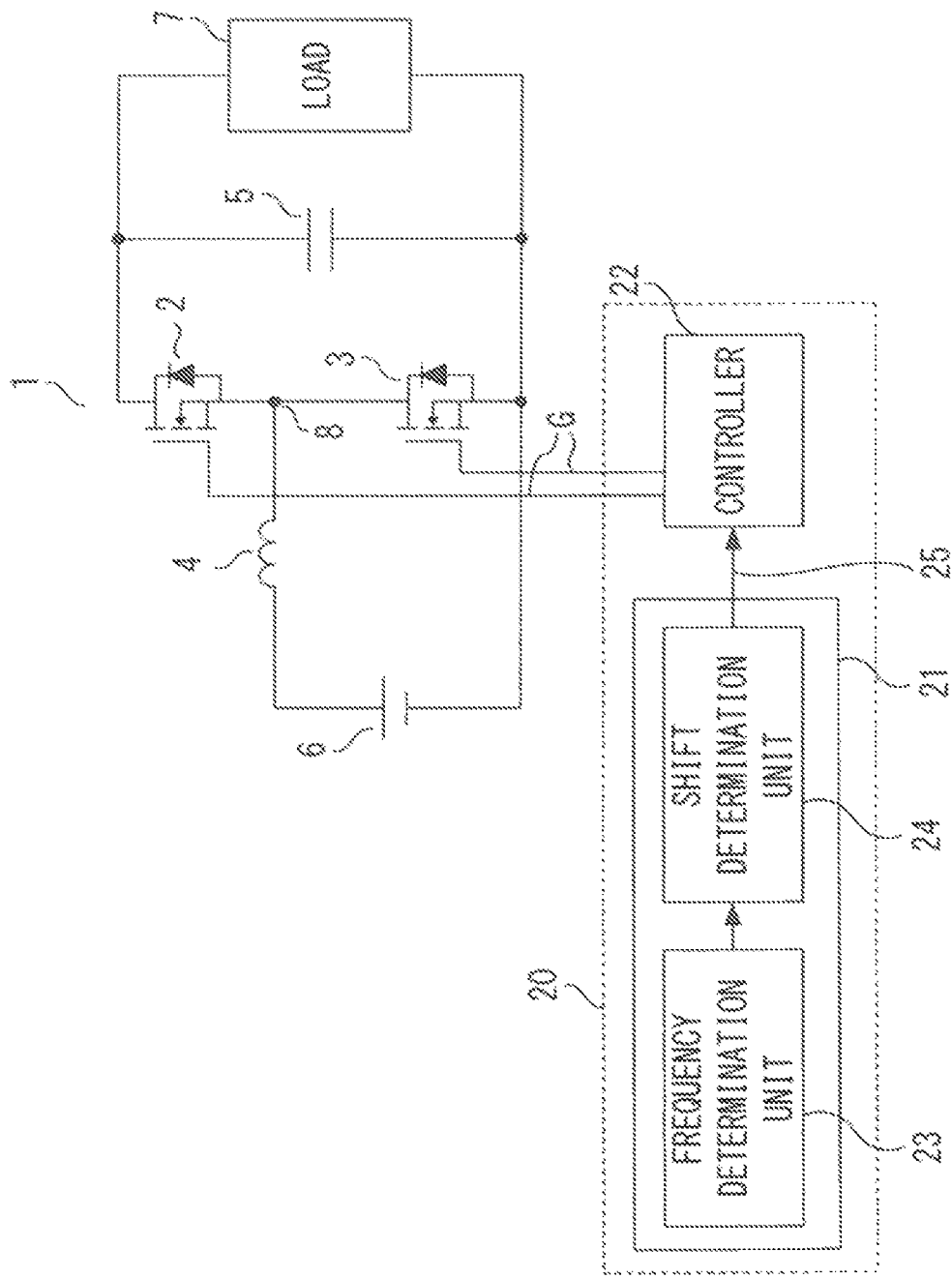
FIG. 1 is a diagram showing the configuration of a power conversion device according to embodiment 1 of the present invention.

Hereinafter, a power conversion device according to embodiment 1 of the present invention will be described with reference to the drawings. FIG. 1 is a configuration diagram of the power conversion device according to embodiment 1 of the present invention.

As shown in FIG. 1, the power conversion device includes: a power conversion circuit 1 composed of a step-up chopper circuit connected between a DC power supply 6 and a load 7; and a control device 20. The power conversion circuit 1 includes a high-voltage-side switching element 2, a low-voltage-side switching element 3, a step-up reactor 4 connected to an input terminal 8 which is the connection point between the two switching elements 2, 3, and a capacitor 5. Through switching operations of the switching elements 2, 3, voltage of input power from the DC power supply 6 is stepped up and thus output power having desired voltage is supplied to the load 7.

As the switching elements 2, 3, self-turn-off semiconductor switching elements such as metal oxide semiconductor field effect transistors (MOSFET) or insulated gate bipolar transistors (IGBT), to which diodes are connected in antiparallel, are used.

The control device 20 includes a pattern generation unit 21 which generates a frequency change pattern 25, and a controller 22 which generates a control signal G for switching each switching element 2, 3 in accordance with the frequency change pattern 25, thereby performing switching control of the switching elements 2, 3 in the power conversion circuit 1. The pattern generation unit 21 includes a frequency determination unit 23 which determines 2n switching frequencies f, and a shift determination unit 24 which determines the shift order for the determined switching frequencies f, to generate the frequency change pattern 25.

The controller 22 generates a carrier wave having each switching frequency f as a carrier frequency, and compares the carrier wave and a command value, to generate the control signal G for each switching element 2, 3. In this case, the control cycle of the controller 22 coincides with the carrier cycle.

It is noted that the command value is given on the basis of ON DUTY of the low-voltage-side switching element 3. In addition, the controller 22 changes the carrier frequencies in synchronization with upper peaks or lower peaks of the carrier wave.

Figure 2:
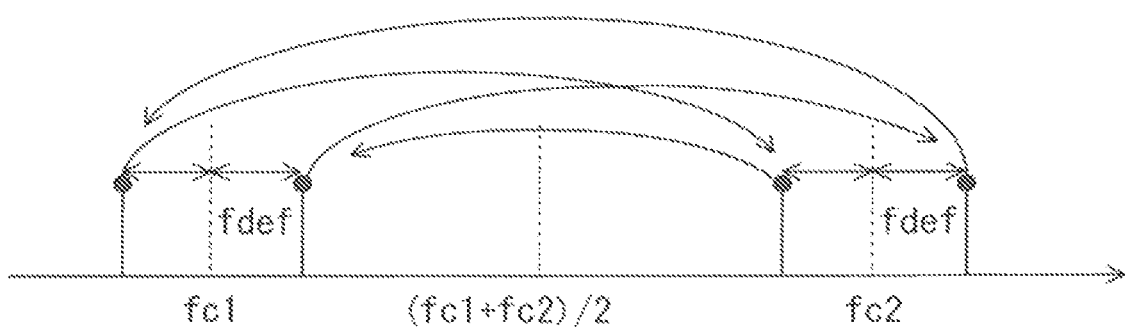
FIG. 2 illustrates a switching frequency and a shift order thereof according to embodiment 1 of the present invention.

FIG. 2 illustrates the switching frequency and the shift order thereof according to the present embodiment 1, and in this case, shows four switching frequencies, assuming n=2.

As shown in FIG. 2, using two first frequencies fc1, fc2 and a second frequency fdef, the frequency determination unit 23 determines four switching frequencies f (fc1−fdef, fc1+fdef, fc2−fdef, fc2+fdef) by adding/subtracting the second frequency fdef to/from each first frequency fc1, fc2 so as to sandwich each first frequency fc1, fc2 (fc1<fc2). It is noted that the second frequency fdef is set to be smaller than the smallest one of differences between the n first frequencies fc, i.e., in this case, set to be smaller than fc2−fc1.

The shift determination unit 24 generates a frequency change pattern 25 which is a repetitive pattern in which the switching frequencies f are each continued for two cycles in the shift order of fc1−fdef, fc2−fdef, fc1+fdef, fc2+fdef. That is, the frequency change pattern 25 is fc1−fdef, fc1−fdef, fc2−def, fc2−fdef, fc1+fdef, fc1+fdef, fc2+fdef, fc2+fdef. The switching frequencies f are different from each other, and therefore the duration time of each switching frequency for two cycles is different.

The details of determination for the shift order of the switching frequencies f will be described later.

Figure 3:
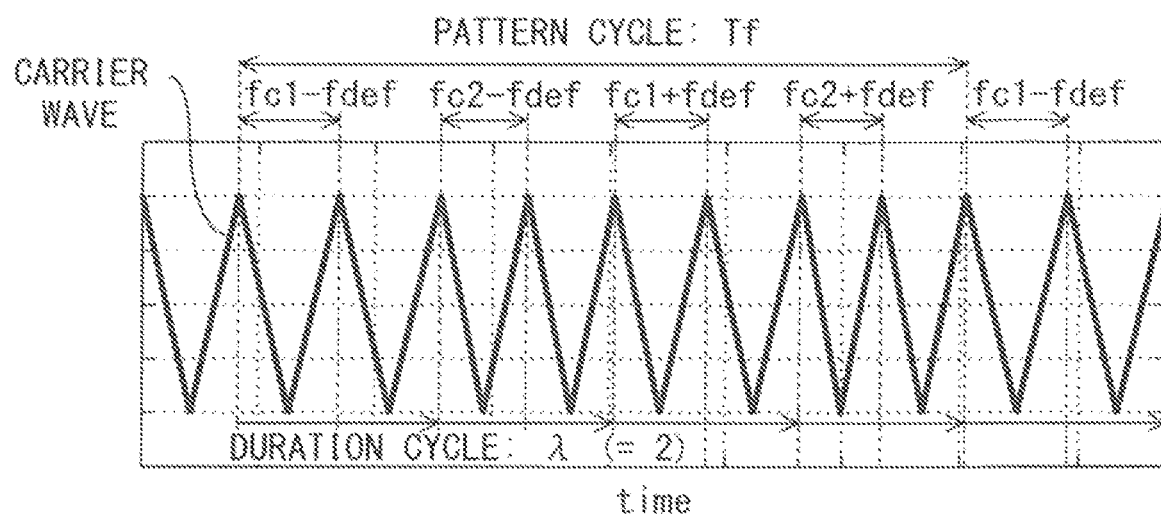
FIG. 3 is a carrier wave according to embodiment 1 of the present invention.

FIG. 3 shows a carrier wave generated using the frequency change pattern 25 determined as described above. As shown in FIG. 3, the controller 22 generates a carrier wave having each switching frequency f as a carrier frequency on the basis of the frequency change pattern 25 repeated with a pattern cycle Tf, and uses the carrier wave for generation of the control signal G. In this case, each carrier frequency continues for two cycles and is switched at a peak of the carrier wave.

Electromagnetic noise in the power conversion circuit 1 shown in FIG. 1 occurs in accordance with potential variation at the input terminal 8 which is the connection point between the switching elements 2, 3. Since the potential of the input terminal 8 is changed by each switching element 2, 3 being turned on or off, the electromagnetic noise occurs at switching frequency components.

Figure 4:
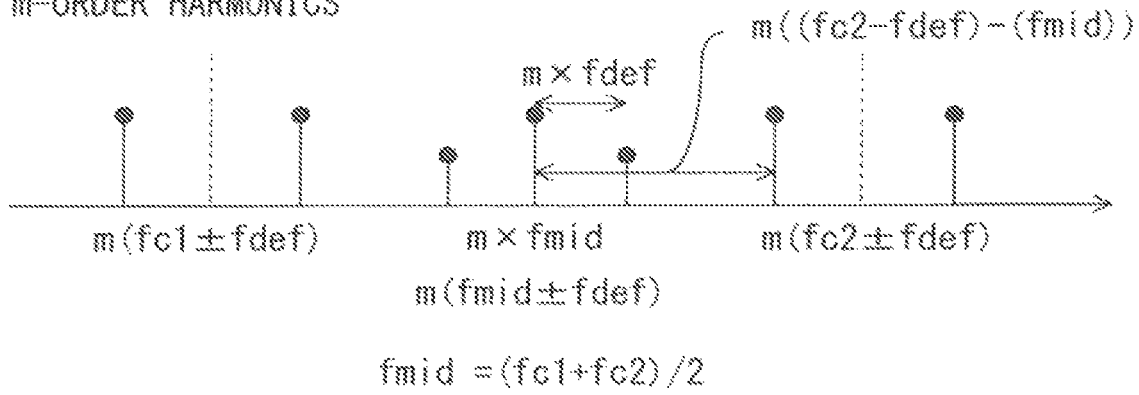
FIG. 4 illustrates a spectrum of harmonic components with respect to switching frequencies according to embodiment 1 of the present invention.

FIG. 4 illustrates a spectrum of harmonic components with respect to the switching frequencies according to the present embodiment 1, and shows harmonic components occurring on the basis of the frequency change pattern 25. In FIG. 4, it is shown that the spectrum of harmonic components is spread and thus peaks are decreased. Prior to description about this, general characteristics of electromagnetic noise will be described.

A method of temporally changing the switching frequency can decrease electromagnetic noise of switching frequency components and is widely used. In the case of temporally changing the switching frequency, a spectrum occurs with a frequency interval obtained by a reciprocal of the cycle (hereinafter, pattern cycle) of a pattern generated such that switching frequencies are continued for respective time periods. Therefore, by prolonging the pattern cycle, the frequency intervals at which peaks appear in the spectrum are narrowed to disperse the peaks of the spectrum, whereby electromagnetic noise can be decreased.

However, it has been newly found out that a generated spectrum changes in accordance with the shift order of the switching frequencies. Therefore, it is impossible to obtain a sufficient peak dispersion effect for electromagnetic noise merely by prolonging the duration time of each switching frequency to prolong the pattern cycle.

Hereinafter, general frequency characteristics of electromagnetic noise due to a switching frequency will be described with reference to FIG. 5 to FIG. 7.

Figure 5:
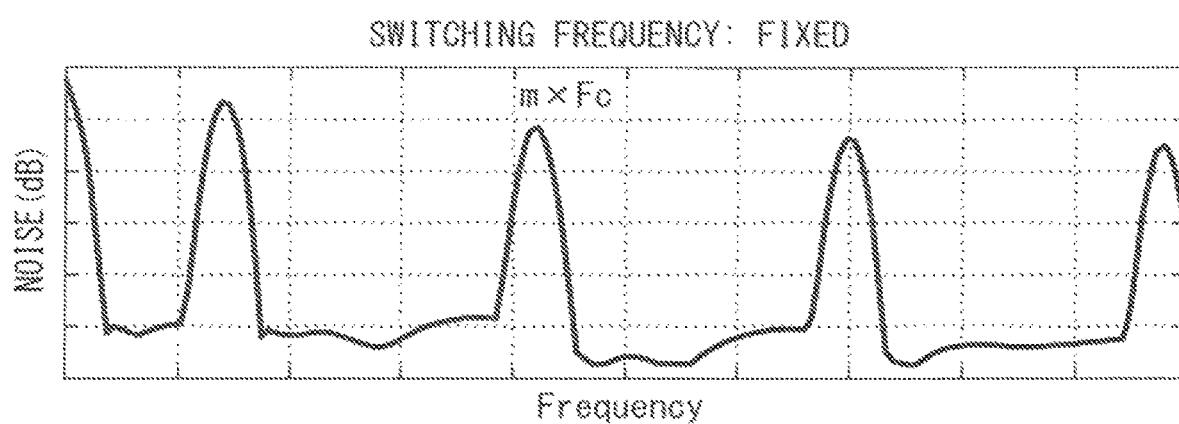
FIG. 5 shows frequency characteristics of electromagnetic noise in the case of using a fixed switching frequency.

FIG. 5 shows frequency characteristics of electromagnetic noise in the case of using a fixed switching frequency Fc. FIG. 6 shows frequency characteristics of electromagnetic noise in the case where two switching frequencies fc1, fc2 are used so as to be shifted on a one-cycle basis. FIG. 7 shows frequency characteristics of electromagnetic noise in the case where two kinds of switching frequencies fc1, fc2 are used on a ten-cycle basis.

As shown in FIG. 5, in the case where the switching frequency Fc is fixed, a spectrum occurs with m-fold components (m: positive odd number) of the switching frequency Fc.

Figure 6:
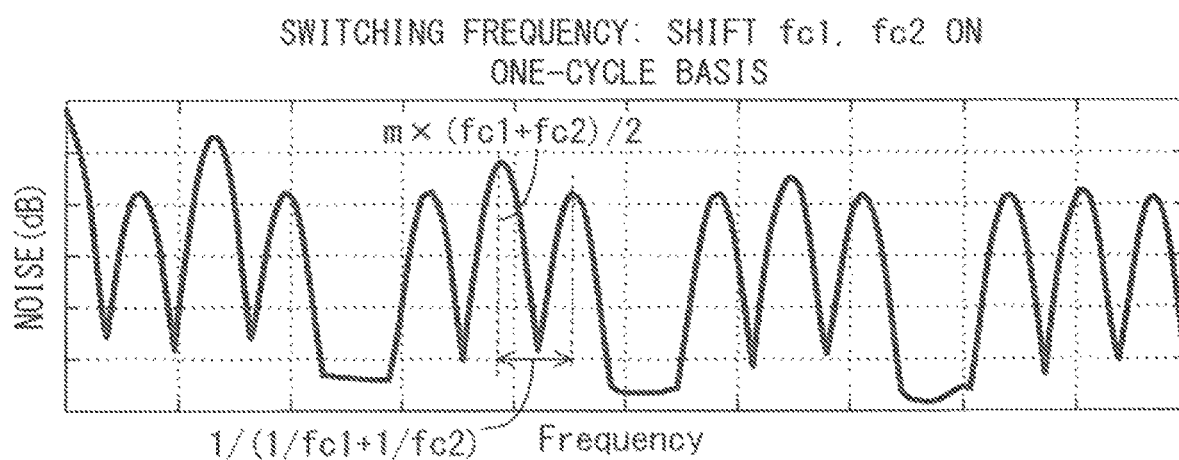
FIG. 6 shows frequency characteristics of electromagnetic noise in the case of using two kinds of switching frequencies on a one-cycle basis.

As shown in FIG. 6, in the case where two kinds of switching frequencies fc1, fc2 are alternately switched every switching cycle, a spectrum occurs with m-fold components of a middle value component (fc1+fc2)/2 between the switching frequencies fc1, fc2. Further, in the spectrum, sideband waves occur at frequency intervals equal to a reciprocal of the pattern cycle ((1/fc1)+(1/fc2)) with respect to the m-order harmonic component of the middle value component.

Figure 7:
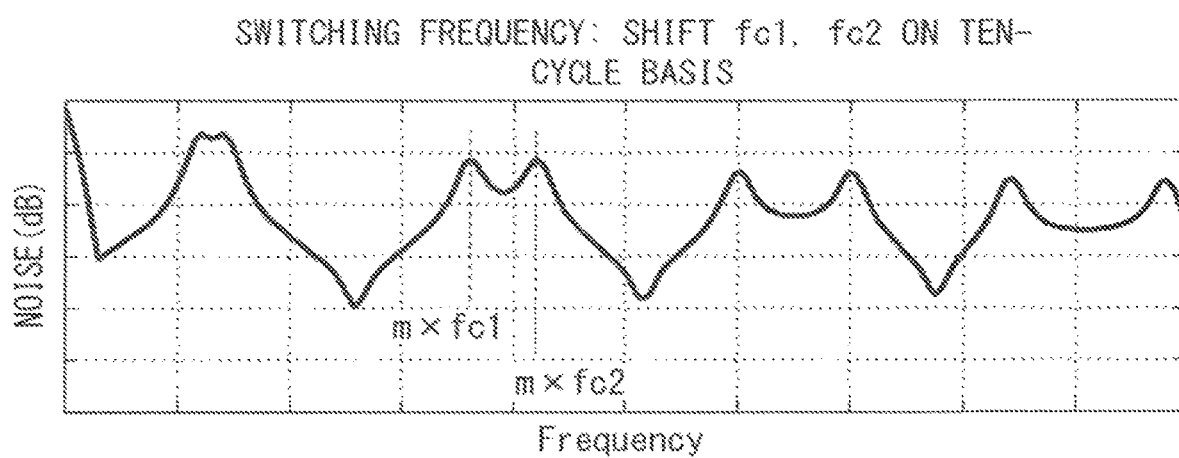
FIG. 7 shows frequency characteristics of electromagnetic noise in the case of using two kinds of switching frequencies on a ten-cycle basis.

As shown in FIG. 7, in the case where two kinds of switching frequencies fc1, fc2 are alternately switched every ten switching cycles, a spectrum occurs with m-fold components of the switching frequencies fc1, fc2.

As described above, a generated spectrum differs between the case where the same switching frequency is used continuously in switching control and the case where the switching frequency is shifted to a different switching frequency in switching control.

In the case where the same switching frequency is used continuously, the m-order harmonic component of the switching frequency arises as a great peak, and in the case of shifting to different switching frequencies, the m-order harmonic component of the middle value component between the switching frequencies before and after the shifting arises as a great peak. In the case of using a plurality of switching frequencies and continuing each switching frequency for a comparatively long period (see FIG. 7), the m-order harmonic component of each switching frequency becomes more dominant than a spectrum occurring due to shifting.

In the present embodiment, the frequency change pattern 25 for effectively dispersing a spectrum is generated in consideration of the fact that a spectrum differs between the case of continuously using the same switching frequency and the case of shifting to different switching frequencies.

Major components of a spectrum occurring in switching using the frequency change pattern 25 are, as shown in FIG. 4, switching frequency components and their harmonic components m(fc1±fdef) and m(fc2±fdef), which occur in the case of continuing the same switching frequency (in this case, for two cycles), and the middle value components of the switching frequencies before and after shifting, and their harmonic components m(fmid) and m(fmid±fdef), which occur in the case of shifting to different switching frequency components. It is noted that fmid is defined as fmid=(fc1+fc2)/2.

The middle values (fmid) and (fmid±fdef) of the switching frequencies before and after shifting do not overlap any of the four switching frequencies fc1±fdef and fc2±fdef.

In this way, both of a spectrum arising in the case of continuously using the same switching frequency and a spectrum arising in the case of shifting to different switching frequencies are generated so as not to overlap each other, thereby spreading an electromagnetic noise spectrum and obtaining a noise decreasing effect by peak dispersion. In addition, by generating the frequency change pattern 25 that is a repetitive pattern in which the four switching frequencies f are each continued for two cycles, a noise decreasing effect by the prolonged pattern cycle Tf is also obtained. Further, by continuing each selected switching frequency f for a plurality of cycles, electromagnetic noise can be caused to occur at harmonic components of that switching frequency, whereby the frequency dispersion effect for electromagnetic noise is further enhanced.

In the example shown in FIG. 2 to FIG. 4, the shift order is set as fc1−fdef, fc2−fdef, fc1+fdef, fc2+fdef. However, without limitation thereto, the shift determination unit 24 determines the shift order such that the middle value between the switching frequencies before and after shifting does not overlap any of the switching frequencies f. In the case where the switching frequencies before and after shifting are fc1−fdef and fc1+fdef, a spectrum of mfc1 occurs, and in the case where the switching frequencies before and after shifting are fc2−fdef and fc2+fdef, a spectrum of mfc2 occurs.

Next, setting of the second frequency fdef to be used for determining the switching frequencies f will be described.

The pattern cycle Tf of the frequency change pattern 25 in which the four switching frequencies f are each continued for two cycles is represented by the following expression (1).

[Mathematical 1]

$$Tf = \left(\frac{2}{fc1 - fdef} + \frac{2}{fc1 + fdef} + \frac{2}{fc2 - fdef} + \frac{2}{fc2 + fdef}\right) \quad (1)$$

By setting fdef so that peaks of a spectrum arise at frequency intervals represented by a reciprocal 1/Tf of the pattern cycle Tf, it becomes possible to cause the spectrum to appear at equal intervals and thus the electromagnetic noise decreasing effect is enhanced. In this case, the second frequency fdef satisfying the following expression (2) is set so that the middle value components of the switching frequencies before and after shifting, and their harmonic components m(fmid), m(fmid±fdef), occur with the frequency interval 1/Tf in the spectrum.

[Mathematical 2]

$$m \times fdef = \frac{1}{Tf} \quad (2)$$

As described above, the second frequency fdef is determined on the basis of (1/(m·Tf)) calculated from the pattern cycle Tf and the decrease target order number m. Thus, noise at harmonic components of the decrease target order number m can be effectively reduced.

The method for setting the second frequency fdef is not limited to the method using expression (2). The second frequency fdef may be set so that the frequency intervals between the spectrum components shown in FIG. 4 are 1/Tf. For example, the second frequency fdef may be set so as to satisfy the following expression (3) or expression (4).

[Mathematical 3]

$$m\left((fc2 - fdef) - \left(\frac{fc1 + fc2}{2} + fdef\right)\right) = \frac{1}{Tf} \quad (3)$$

[Mathematical 4]

$$m\left((fc2 - fdef) - \left(\frac{fc1 + fc2}{2}\right)\right) = \frac{1}{Tf} \quad (4)$$

Another example of a setting method (referred to as second setting method) which simplifies calculation of the second frequency fdef will be described below.

Figure 8:
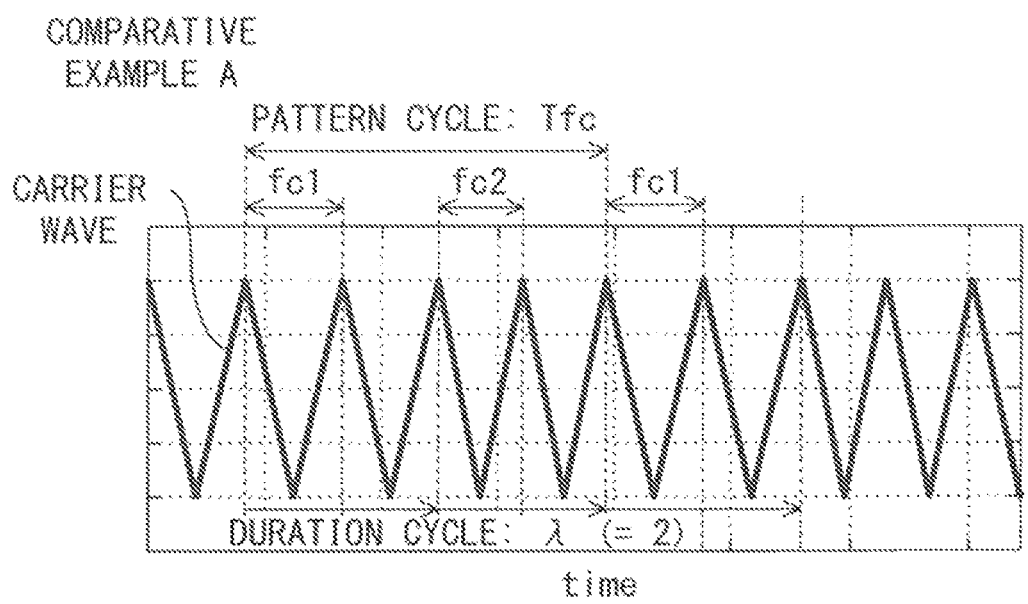
FIG. 8 shows a carrier wave in comparative example A of embodiment 1 of the present invention.

As comparative example A, the case of using a switching frequency change pattern in which only two first frequencies fc1, fc2 are each continued for two cycles, is assumed. FIG. 8 shows a carrier wave in the comparative example A.

In the comparative example A, a pattern cycle Tfc is represented by the following expression (5). Then, spectrum peaks arise at frequency intervals represented by a reciprocal 1/Tfc of the pattern cycle Tfc.

[Mathematical 5]

$$Tfc = \frac{2}{fc1} + \frac{2}{fc2} \quad (5)$$

In the present embodiment, since the four switching frequencies fc1±fdef and fc2±fdef are used, in the second setting method for the second frequency fdef, fdef is set so that spectrum peaks arise with a frequency interval that is half the frequency interval 1/Tfc of the comparative example A. Thus, it becomes possible to cause the spectrum to appear at equal intervals and the electromagnetic noise decreasing effect is enhanced.

In this case, the second frequency fdef satisfying the following expression (6) is set so that the middle value components of the switching frequencies before and after shifting and their harmonic components m(fmid) and m(fmid±fdef) occur with the frequency interval 1/2Tfc in the spectrum.

[Mathematical 6]

$$m \times fdef = \frac{1}{2Tfc} \quad (6)$$

In this way, the second frequency fdef is determined on the basis of (1/(2m·Tfc)) calculated from the decrease target order number m and the cycle Tfc of the pattern in which only two first frequencies fc1, fc2 are each continued for two cycles. Thus, noise at harmonic components of the decrease target order number m can be effectively decreased.

The method for setting the second frequency fdef on the basis of (1/(2m·Tfc)) is not limited to the method using expression (6). The second frequency fdef may be set so that the frequency intervals between the spectrum components shown in FIG. 4 are 1/2Tfc. For example, the second frequency fdef may be set so as to satisfy the following expression (7) or expression (8).

[Mathematical 7]

$$m\left((fc2 - fdef) - \left(\frac{fc1 + fc2}{2} + fdef\right)\right) = \frac{1}{2Tfc} \quad (7)$$

[Mathematical 8]

$$m\left((fc2 - fdef) - \left(\frac{fc1 + fc2}{2}\right)\right) = \frac{1}{2Tfc} \quad (8)$$

Figure 9:
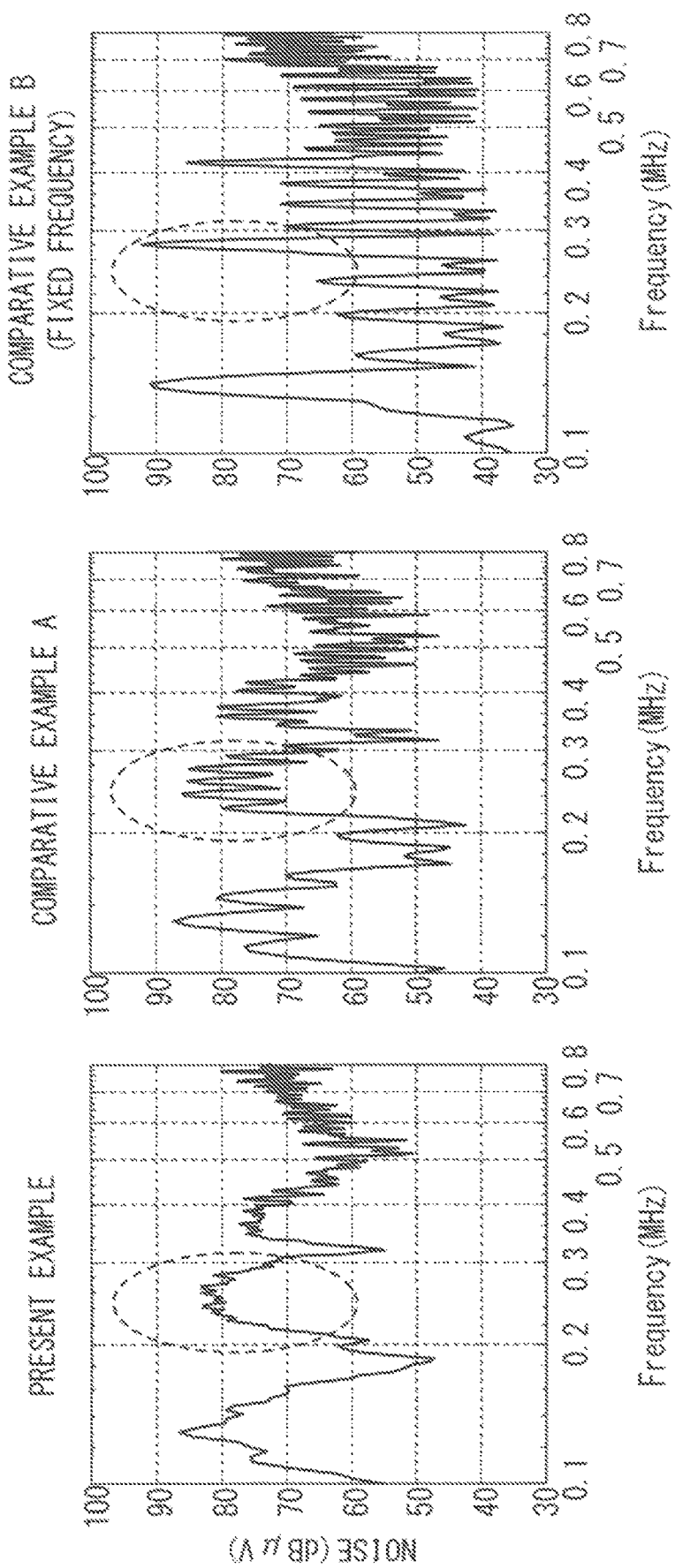
FIG. 9 illustrates an electromagnetic noise decreasing effect according to embodiment 1 of the present invention.

FIG. 9 illustrates the electromagnetic noise decreasing effect according to the present embodiment, and shows the case of the comparative example A using the carrier wave shown in FIG. 8, and the case of comparative example B using a fixed switching frequency, together with an example (present example) in which the four switching frequencies fc1±fdef, fc2±fdef are used in the present embodiment. In addition, FIG. 10 shows enlarged views of areas enclosed by dotted lines in FIG. 9.

Figure 10:
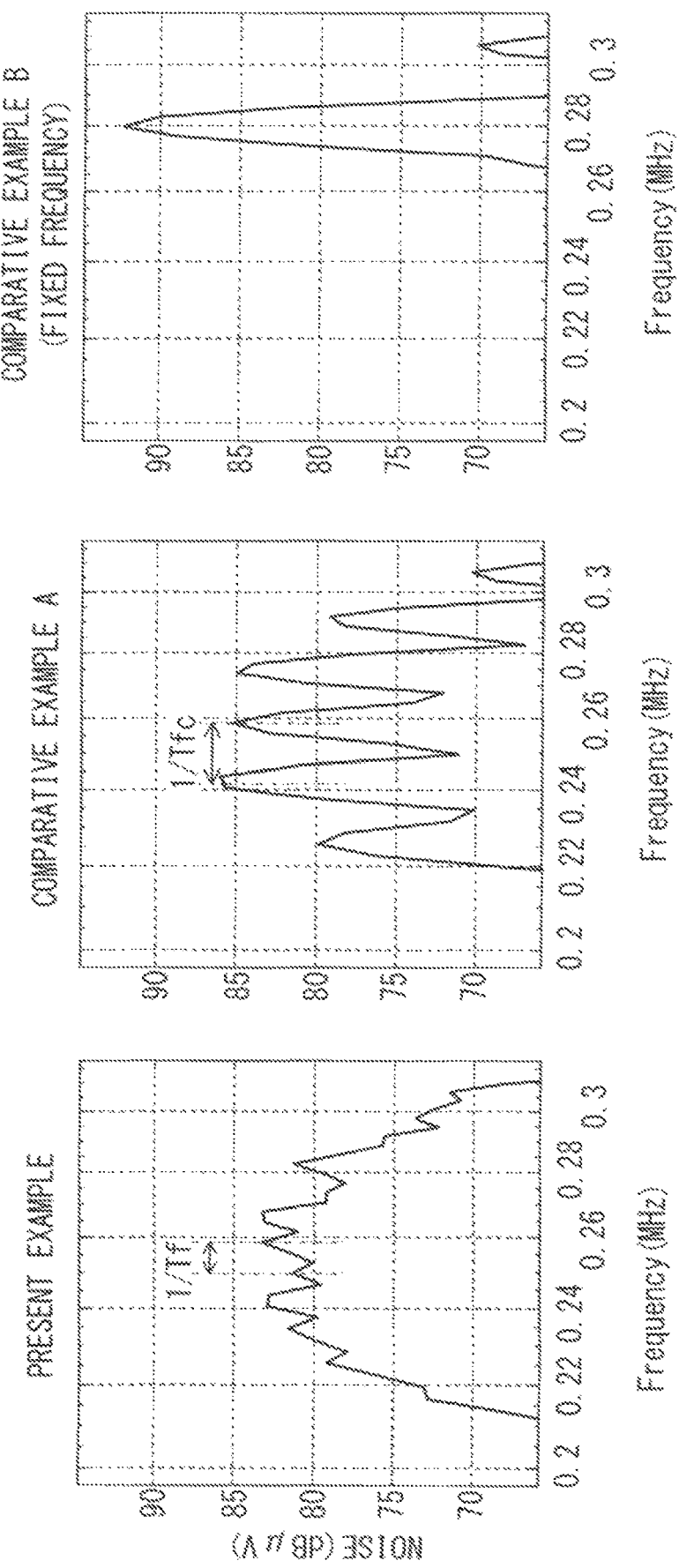
FIG. 10 is an enlarged view of a part of FIG. 9.

As shown in FIG. 9 and FIG. 10, in the case of comparative example A, a peak dispersion effect by the spread spectrum is obtained significantly as compared to the comparative example B using a fixed switching frequency, and in the present example of this embodiment, the electromagnetic noise spectrum is further spread as compared to comparative example A, and thus noise reduction by peak dispersion is achieved.

Figure 11:
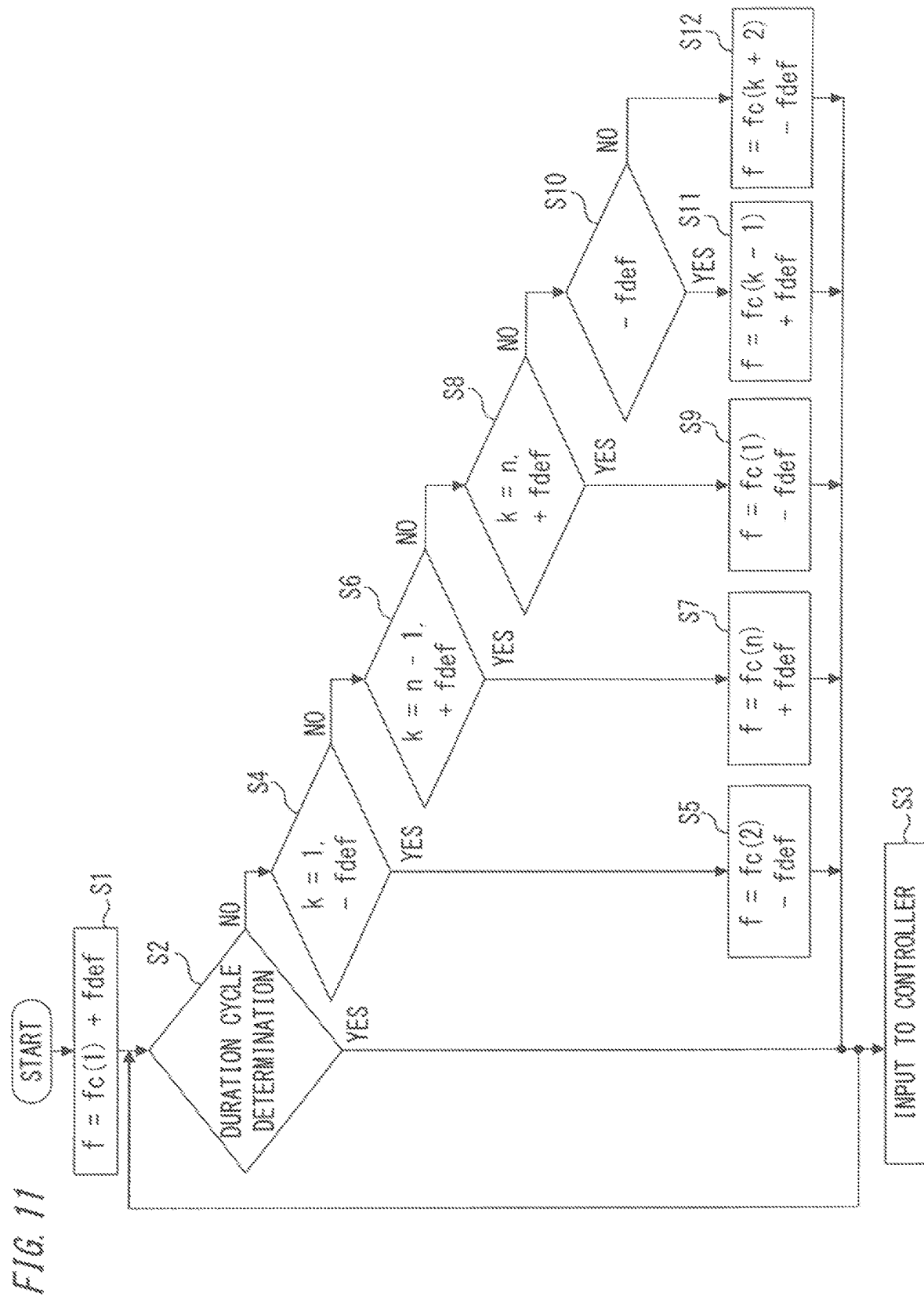
FIG. 11 is a flowchart showing generation of a frequency change pattern according to embodiment 1 of the present invention.

Next, operation of the shift determination unit 24 will be described. FIG. 11 is a flowchart showing a process for determining the shift order of the switching frequencies f and generating a frequency change pattern. In accordance with the flowchart shown in FIG. 11, the shift determination unit 24 sequentially selects, with a predetermined duration cycle λ, the switching frequency f from among 2n switching frequencies f (=fc(k)±fdef (k: integer from 1 to n)), and inputs the selected switching frequency f to the controller 22, whereby the shift order is determined and the frequency change pattern 25 is generated.

First, f is set to fc(1)+fdef, and a value greater than A is set as an initial value of the present cycle of the switching frequency f (step S1).

Next, whether or not the present cycle of the present switching frequency f is equal to or smaller than the duration cycle λ, i.e., whether or not the present cycle is a cycle in which the present switching frequency f is to be continued, is determined (step S2). If the present cycle is a cycle in which the present switching frequency f is to be continued (YES), the present switching frequency f is selected and inputted to the controller 22, and then the value of the present cycle is increased by 1 (step S3), to return to step S2.

In step S2, if the present cycle of the present switching frequency f is greater than the duration cycle A (NO), whether or not f=fc(1)−fdef is satisfied is determined (step S4). Then, in the case of YES, f is set to fc(2)−fdef and the present cycle is set to 1 (step S5), to return to step S3.

In step S4, in the case of NO, whether or not f=fc(n−1)+fdef is satisfied is determined (step S6). Then, in the case of YES, f is set to fc(n)+fdef and the present cycle is set to 1 (step S7), to return to step S3.

In step S6, in the case of NO, whether or not f=fc(n)+fdef is satisfied is determined (step S8). Then, in the case of YES, f is set to fc(1)−fdef and the present cycle is set to 1 (step S9), to return to step S3.

In step S8, in the case of NO, whether or not f=fc(k)−fdef is satisfied is determined (step S10). Then, in the case of YES, f is set to fc(k−1)+fdef and the present cycle is set to 1 (step S11), to return to step S3.

In step S10, in the case of NO, f is set to fc(k+2)−fdef and the present cycle is set to 1 (step S12), to return to step S3.

In the above flow, when n is 2, the shift order is fc(2)+fdef, fc(1)−fdef, fc(2)−fdef, fc(1)+fdef. When n is 3 or greater, the shift order satisfies an order of fc(n)−fdef, fc(n−1)+fdef, fc(n)+fdef, fc(1)−fdef, fc(2)−fdef, and for k=1 to n−2, satisfies an order of fc(k+1)−fdef, fc(k)+fdef, fc(k+2)−fdef.

It is noted that, since the frequency change pattern 25 is a repetitive pattern, the start point thereof is optional.

Figure 12:
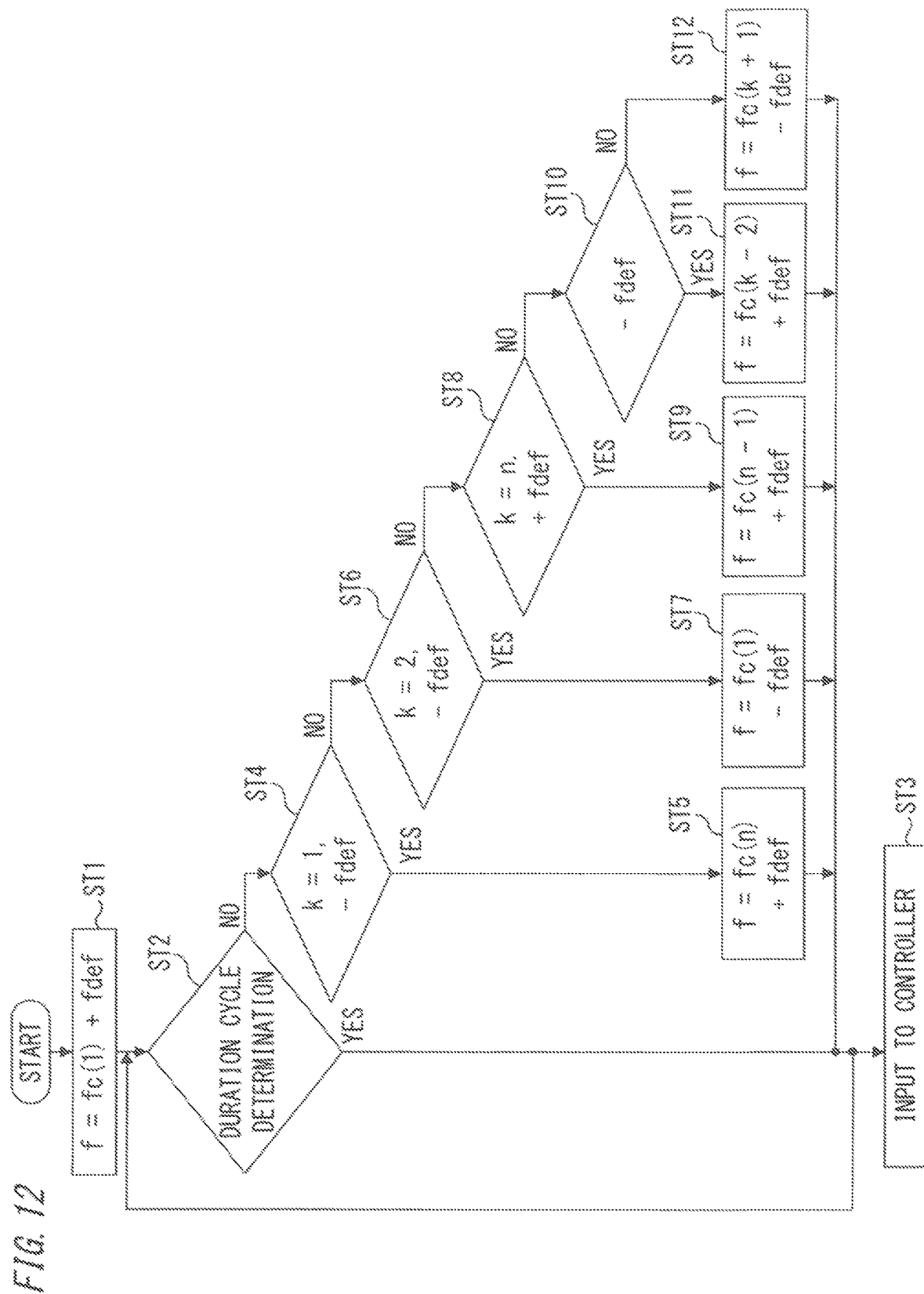
FIG. 12 is a flowchart showing generation of a frequency change pattern in another example of embodiment 1 of the present invention.

It is noted that the shift order of the switching frequencies f described above may be reversed. FIG. 12 shows a flowchart for such a case.

First, f is set to fc(1)+fdef, and a value greater than λ is set as an initial value of the present cycle of the switching frequency f (step ST1).

Next, whether or not the present cycle of the present switching frequency f is equal to or smaller than the duration cycle λ, i.e., whether or not the present cycle is a cycle in which the present switching frequency f is to be continued, is determined (step ST2). If the present cycle is a cycle in which the present switching frequency f is to be continued (YES), the present switching frequency f is selected and inputted to the controller 22, and then the value of the present cycle is increased by 1 (step ST3), to return to step ST2.

In step ST2, if the present cycle of the present switching frequency f is greater than the duration cycle λ (NO), whether or not f=fc(1)−fdef is satisfied is determined (step ST4). Then, in the case of YES, f is set to fc(n)+fdef and the present cycle is set to 1 (step ST5), to return to step ST3.

In step ST4, in the case of NO, whether or not f fc(2)−fdef is satisfied is determined (step ST6). Then, in the case of YES, f is set to fc(1)−fdef and the present cycle is set to 1 (step ST7), to return to step ST3.

In step ST6, in the case of NO, whether or not f=fc(n)+fdef is satisfied is determined (step ST8). Then, in the case of YES, f is set to fc(n−1)+fdef and the present cycle is set to 1 (step ST9), to return to step ST3.

In step ST8, in the case of NO, whether or not f=fc(k)−fdef is satisfied is determined (step ST10). Then, in the case of YES, f is set to fc(k−2)+fdef and the present cycle is set to 1 (step ST11), to return to step ST3.

In step ST10, in the case of NO, f is set to fc(k+1)−fdef and the present cycle is set to 1 (step ST12), to return to step ST3.

In the flowchart shown in FIG. 12, when n is 2, the shift order is fc(2)−fdef, fc(1)−fdef, fc(2)+fdef, fc(1)+fdef. When n is 3 or greater, the shift order satisfies an order of fc(2)−fdef, fc(1)−fdef, fc(n)+fdef, fc(n−1)+fdef, fc(n)−fdef, and for k=1 to n−2, satisfies an order of fc(k+2)−fdef, fc(k)+fdef, fc(k+1)−fdef.

In the above description, the shift determination unit 24 sequentially selects the switching frequency f and inputs the selected switching frequency f to the controller 22, thereby generating the frequency change pattern 25. However, the shift determination unit 24 may have a table in which a shift order is set in advance and thereby generate the frequency change pattern 25.

As described above, in the present embodiment, the pattern generation unit 21 generates the frequency change pattern 25 in which 2n switching frequencies f determined from n first frequencies fc and a second frequency fdef smaller than the smallest one of differences between the n first frequencies fc are each used for predetermined duration cycles (different duration time) in such a shift order that the middle value between two switching frequencies f before and after shifting does not overlap the value of each switching frequency f.

Thus, a spectrum that arises in the case of continuously using the same switching frequency and a spectrum that arises in the case of shifting to different switching frequencies are prevented from overlapping each other, so that concentration of peaks in a spectrum of electromagnetic noise is avoided and the spectrum of electromagnetic noise is spread, thereby obtaining a noise decreasing effect by peak dispersion. In addition, by prolonging the pattern cycle Tf of the frequency change pattern 25, it is possible to equally disperse spectrum peaks occurring at intervals represented by a reciprocal of the pattern cycle Tf, whereby the noise can be further reduced.

Thus, increase in the variation width of the switching frequency is suppressed, electromagnetic noise can be effectively decreased over a wide frequency band, and a noise filter can be downsized. In addition, since increase in the variation width of the switching frequency is suppressed, heat generation from the switching elements due to usage of a high switching frequency can be suppressed.

The frequency is changed at upper peaks or lower peaks of the carrier wave, and the duration times of the respective switching frequencies are different from each other. Thus, the duration time of each switching frequency can be prevented from being excessively prolonged, and increase in current ripple before and after changing of the switching frequency f can be prevented, whereby stable switching control can be performed.

In the above embodiment, each switching frequency f is continuously used for two cycles. By thus continuing each switching frequency f for a plurality of cycles, a spectrum that arises in the case of continuously using the same switching frequency is assuredly generated for each switching frequency f, and this spectrum and a spectrum that arises in the case of shifting to different switching frequencies are generated so as not to overlap each other, whereby the peak dispersion effect by spreading of electromagnetic noise spectrum is further enhanced and thus noise can be further decreased.

It is noted that the duration cycles of the switching frequencies f may be different from each other. Although a great effect is obtained by continuing every switching frequency f for a plurality of cycles, the effect is obtained even by continuing at least one switching frequency f for a plurality of cycles.

In the above embodiment, 2n second frequencies fdef to be added/subtracted to/from the first frequencies fc are the same frequency, and therefore the calculation is facilitated.

In addition, by determining the second frequency fdef on the basis of (1/(m·Tf)) calculated from the pattern cycle Tf and the decrease target order number m, noise at harmonic components of the decrease target order number m can be effectively reduced.

In the case where each switching frequency f is continued for the same number λ of cycles, by determining the second frequency fdef on the basis of (1/(2m·Tfc)) calculated from the decrease target order number m and the cycle Tfc of the pattern in which n first frequencies fc are each continued for the number λ of cycles, noise at harmonic components of the decrease target order number m can be effectively reduced and the second frequency fdef can be easily calculated.

The switching frequency f is shifted in the order determined in accordance with the flowchart shown in FIG. 11 or FIG. 12. Therefore, it is possible to easily determine such a shift order that the middle value between the two switching frequencies f before and after shifting does not overlap any switching frequency f.

It is noted that the 2n second frequencies fdef to be added/subtracted to/from the first frequencies fc may not be the same value. The above noise decreasing effect can be obtained as long as each of the 2n second frequencies fdef is smaller than the smallest one of differences between the n first frequencies fc.

In the above embodiment, the pattern generation unit 21 adds/subtracts the second frequency fdef to/from the first frequencies fc, to calculate 2n switching frequencies. However, a table in which 2n switching frequencies generated in advance are set may be stored.

Embodiment 2

In the above embodiment 1, the frequency change pattern 25 is generated such that 2n switching frequencies f are each continued for predetermined duration cycles in a determined shift order. In the present embodiment 2, a frequency change pattern 25X is generated such that only the shift order of the 2n switching frequencies f is determined, without including information about duration cycles (duration time).

Figure 13:
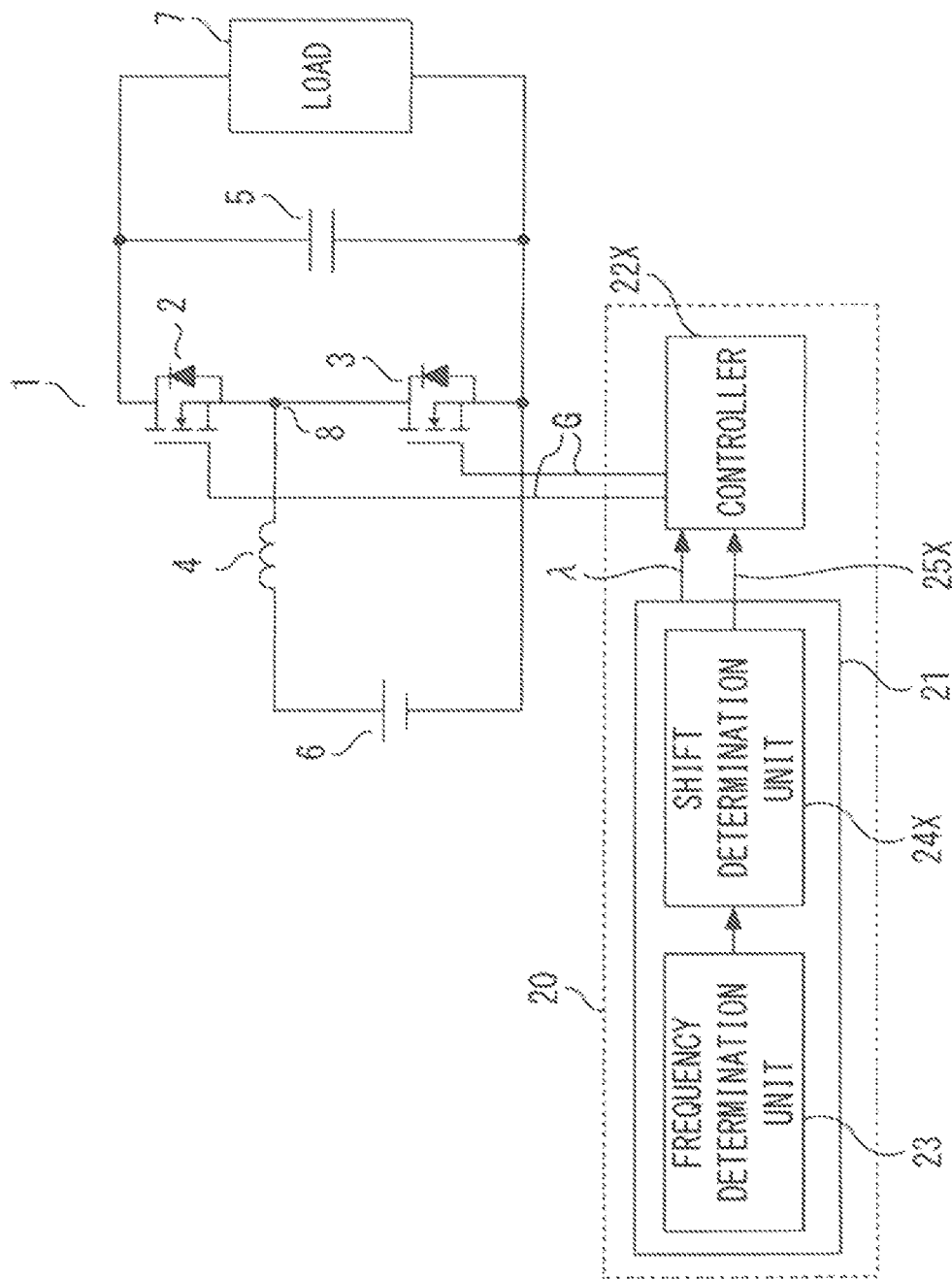
FIG. 13 is a diagram showing the configuration of a power conversion device according to embodiment 2 of the present invention.

FIG. 13 is a configuration diagram of a power conversion device according to embodiment 2 of the present invention.

As shown in FIG. 13, a shift determination unit 24X in the pattern generation unit 21 determines the shift order of the switching frequencies f determined by the frequency determination unit 23, to generate a frequency change pattern 25X. Then, a controller 22X acquires the frequency change pattern 25X and duration cycle information (duration cycles λ), generates a carrier wave such that the 2n switching frequencies f are each continued for predetermined duration cycles λ in the determined shift order, and generates a control signal G for switching each switching element 2, 3. The other configurations are the same as those in the above embodiment 1.

In the case of using the carrier wave shown in FIG. 3, the frequency change pattern 25X is fc1−fdef, fc2−fdef, fc1+fdef, fc2+fdef. In the controller 22X, the control cycle is set on the basis of the duration cycle information. For example, in the case where A is 2 and each switching frequency f is used for two cycles, the control cycle is set to be two cycles of the carrier cycle, and in accordance with the frequency change pattern 25X, the carrier frequency is changed every two cycles of the carrier cycle.

It is noted that the carrier frequency is equal to the switching frequency f, and the control cycle is set to an integer multiple of the carrier frequency.

In addition, the number of cycles of the carrier cycle to which the control cycle is set may be variable with respect to each carrier frequency.

As described above, in the present embodiment 2, only the shift order of 2n switching frequencies f is determined to generate the frequency change pattern 25X, and the control cycle of the controller 22X is set to be equal to a period of the duration cycles A (duration time) for each carrier frequency. Therefore, the control cycle of the controller 22X can be set to a cycle obtained by multiplying the carrier cycle by an integer of 2 or greater. Thus, while a noise decreasing effect is obtained as in the above embodiment 1, the control cycle can be set to be long, whereby it becomes possible to use an inexpensive microcomputer having slow calculation speed.

Embodiment 3

In the above embodiment 1, electromagnetic noise occurring in the power conversion circuit 1 is measured by a spectrum analyzer. As described above, a spectrum occurs with frequency intervals calculated by a reciprocal of the cycle Tf of the pattern generated such that the switching frequencies f are continued for the respective time periods.

In the present embodiment, the frequency change pattern 25 is determined so that the reciprocal 1/Tf of the pattern cycle Tf becomes equal to or greater than the resolution bandwidth (RBW) for measurement by the spectrum analyzer. The other configurations are the same as those in the above embodiment 1.

Regarding switching noise, in order to keep a certain consistency among the countries' standards, the international organization CISPR (Comite international special des perturbations radioelelctriques) establishes electromagnetic compatibility (EMC) standards for automobiles and electronic devices in various fields.

As described in the above embodiment 1, by prolonging the pattern cycle Tf of the frequency change pattern 25, spectrum peaks occurring at intervals represented by the reciprocal 1/Tf of the pattern cycle Tf are equally dispersed, whereby a noise decreasing effect is obtained. In the present embodiment, the pattern cycle Tf is prolonged to such an extent that the reciprocal 1/Tf of the pattern cycle Tf does not become smaller than RBW of the spectrum analyzer.

Thus, a noise decreasing effect can be assuredly obtained in a result of measurement by the spectrum analyzer.

It is noted that the above pattern cycle Tf coincides with the pattern cycle of the frequency change pattern 25.

The present embodiment is also applicable to the above embodiment 2, and in this case, the pattern cycle Tf does not coincide with the cycle of the frequency change pattern 25X, but is the cycle of a repetitive pattern generated such that the switching frequencies f are continued for the respective time periods.

Embodiment 4

Figure 14:
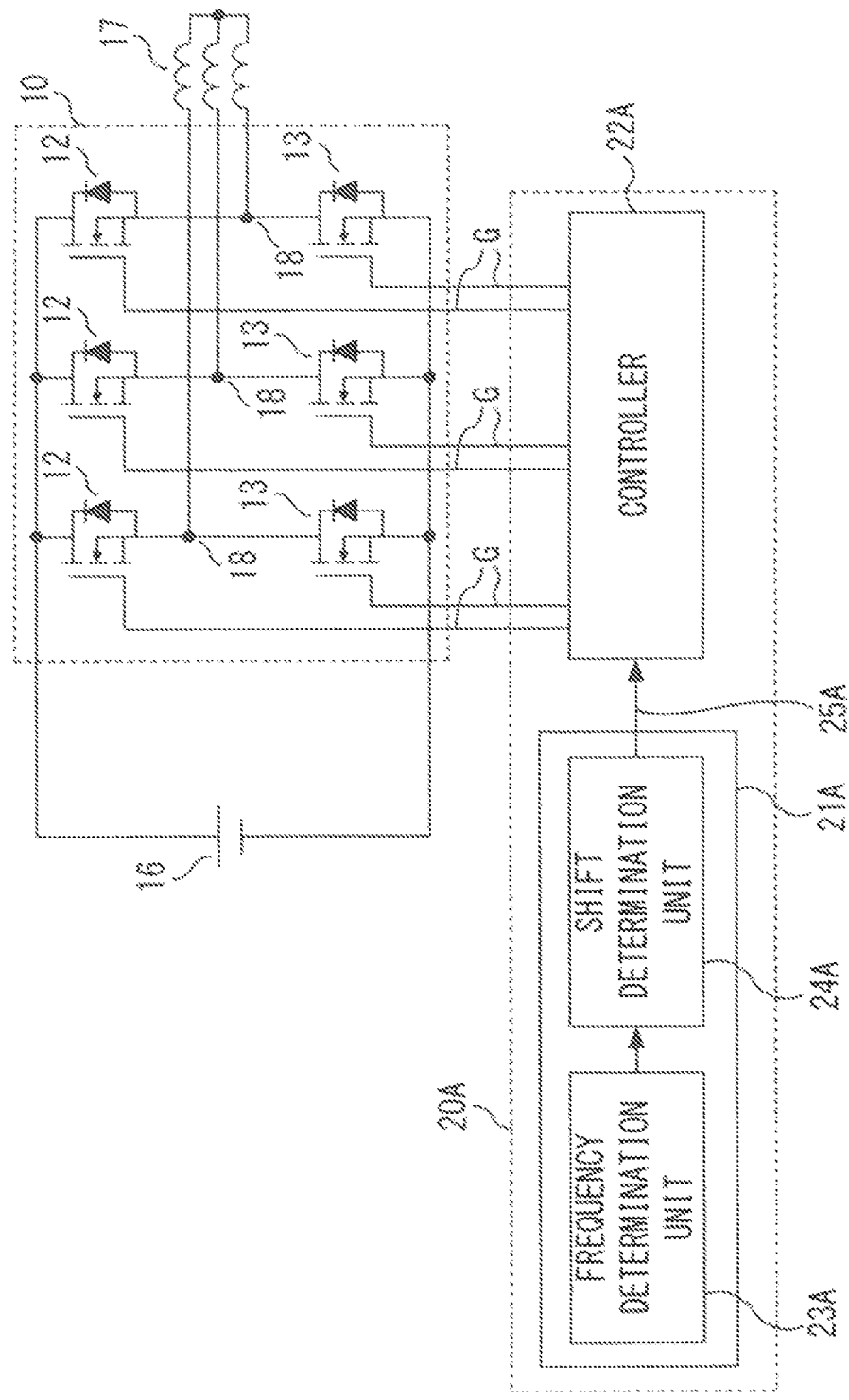
FIG. 14 is a diagram showing the configuration of a power conversion device according to embodiment 4 of the present invention.

In the above embodiments, a power conversion circuit composed of a step-up chopper circuit is used, but another type of power conversion circuit may be applied. FIG. 14 is a configuration diagram of a power conversion device according to embodiment 4 of the present invention.

As shown in FIG. 14, the power conversion device includes: a power conversion circuit 10 composed of a three-phase inverter circuit connected between a DC power supply 16 and a three-phase load 17; and a control device 20A. The power conversion circuit 10 includes, in each phase, a high-voltage-side switching element 12 and a low-voltage-side switching element 13. Through switching operations of the switching elements 12, 13, DC power inputted from the DC power supply 16 is converted to AC power, and the AC power is supplied to a three-phase load 17 connected to output terminals 18.

As the switching elements 12, 13, self-turn-off semiconductor switching elements such as MOSFET or IGBT to which diodes are connected in antiparallel are used.

The control device 20A includes a pattern generation unit 21A which generates a frequency change pattern 25A, and a controller 22A which generates a control signal G for switching each switching element 12, 13 in accordance with the frequency change pattern 25A, thereby performing switching control of the switching elements 12, 13 in the power conversion circuit 10. The pattern generation unit 21A includes a frequency determination unit 23A which determines 2n switching frequencies f, and a shift determination unit 24A which determines the shift order for the determined switching frequencies f, to generate the frequency change pattern 25A.

Also in the present embodiment, as in the above embodiment 1, the pattern generation unit 21A generates the frequency change pattern 25A in which 2n switching frequencies f determined from n first frequencies fc and a second frequency fdef smaller than the smallest one of differences between the n first frequencies fc are each used for predetermined duration cycles (different duration time) in such a shift order that the middle value between two switching frequencies f before and after shifting does not overlap the value of each switching frequency f. Then, for each phase, the controller 22A generates a control signal G for each switching element 12, 13 through comparison between a command value and a carrier wave based on the frequency change pattern 25A.

Thus, as in the above embodiment 1, concentration of peaks in a spectrum of electromagnetic noise is avoided and the spectrum of electromagnetic noise is spread, whereby a noise decreasing effect by peak dispersion is obtained.

Also in the above embodiments 2, 3, instead of the power conversion circuit composed of a step-up chopper circuit, another type of power conversion circuit such as the power conversion circuit 10 composed of a three-phase inverter circuit may be applied, whereby the same effects can be obtained.

Embodiment 5

Figure 15:
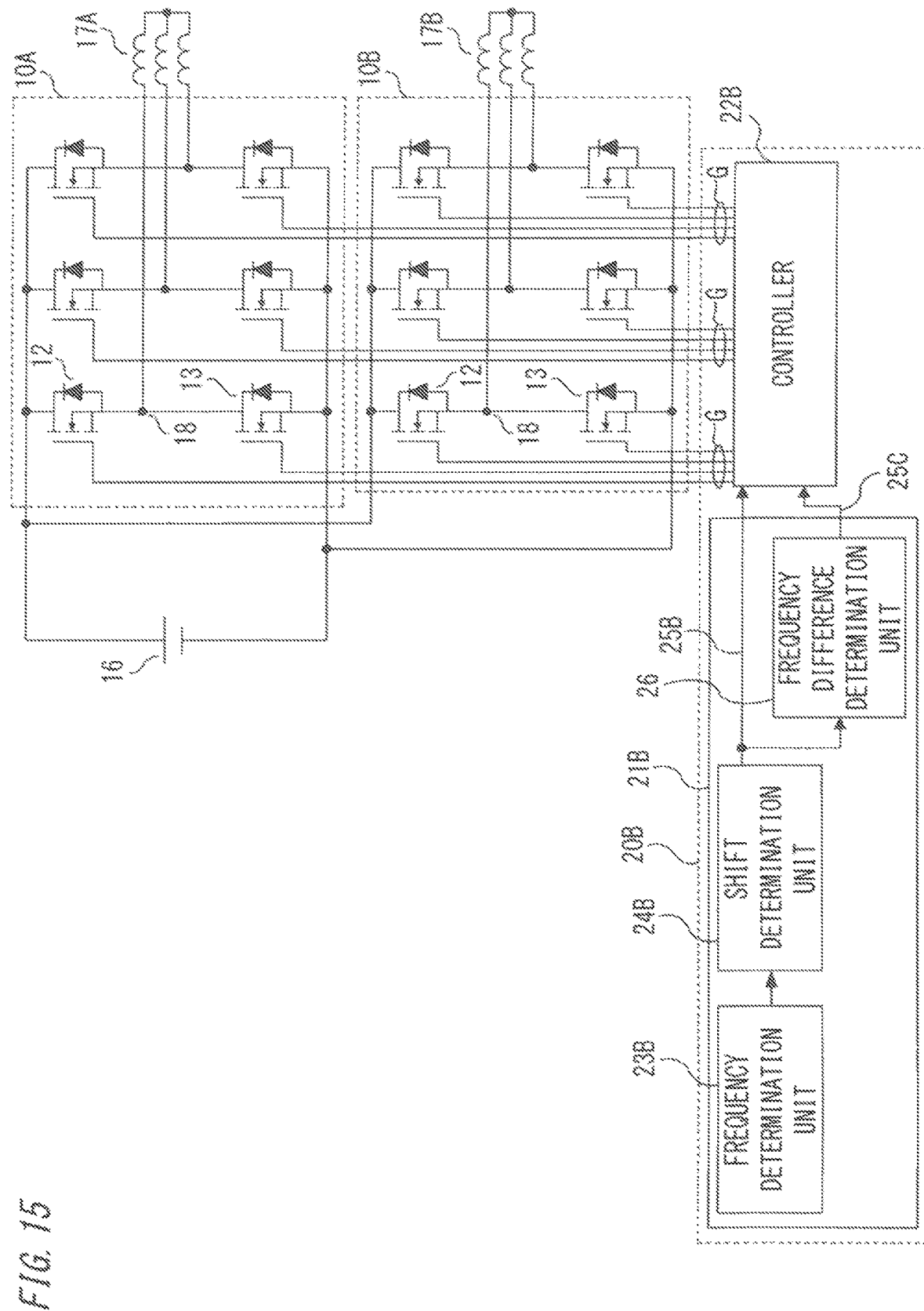
FIG. 15 is a diagram showing the configuration of a power conversion device according to embodiment 5 of the present invention.

Next, a power conversion device according to embodiment 5 of the present invention will be described. FIG. 15 is a configuration diagram of the power conversion device according to embodiment 5 of the present invention.

As shown in FIG. 15, the power conversion device includes a first power conversion circuit 10A and a second power conversion circuit 10B composed of three-phase inverter circuits and arranged in parallel. The first and second power conversion circuits 10A, 10B each have the same configuration as the power conversion circuit 10 of the above embodiment 4, and their DC sides are connected to the same DC power supply 16. A three-phase load 17A is connected to the AC side of the first power conversion circuit 10A, and a three-phase load 17B is connected to the AC side of the second power conversion circuit 10B. The first and second power conversion circuits 10A, 10B convert DC power inputted from the DC power supply 16 to AC power, and supply the AC power to the respective three-phase loads 17A, 17B.

The power conversion device includes a control device 20B which controls the first and second power conversion circuits 10A, 10B. The control device 20B includes: a pattern generation unit 21B which generates a frequency change pattern (first pattern) 25B for the first power conversion circuit 10A and a frequency change pattern (second pattern) 25C for the second power conversion circuit 10B; and a controller 22B which generates a control signal G for switching each switching element 12, 13 in the first and second power conversion circuits 10A, 10B, and thus the control device 20B performs switching control of the switching elements 12, 13. The pattern generation unit 21B includes: a frequency determination unit 23B which determines 2n switching frequencies f; a shift determination unit 24B which determines the shift order for the determined switching frequencies f and generates the frequency change pattern 25B; and a frequency difference determination unit 26 which determines a frequency difference 2Δf described later and generates the frequency change pattern 25C from the frequency difference 2Δf and the frequency change pattern 25B.

The controller 22B generates a carrier wave having each switching frequency f as a carrier frequency, on the basis of the frequency change pattern 25B, and generates a control signal G for each switching element 12, 13 in the first power conversion circuit 10A through comparison between the carrier wave and a command value. Similarly, on the basis of the frequency change pattern 25C, the controller 22B generates a control signal G for each switching element 12, 13 in the second power conversion circuit 10B.

It is noted that the generation method for the frequency change pattern 25B is the same as in the above embodiment 4, and the method for generating the control signal G for each switching element 12, 13 on the basis of the frequency change pattern 25B, 25C is also the same as in the above embodiment 4.

Then, a frequency change pattern 25C is generated such that a frequency obtained by adding a frequency difference 2Δf to the greatest switching frequency in the frequency change pattern 25B is used as the smallest switching frequency in the frequency change pattern 25C.

For example, in the case where the frequency change pattern 25B is formed by four switching frequencies f (fc1−fdef, fc1+fdef, fc2−fdef, fc2+fdef) determined using two first frequencies fc1, fc2 and a second frequency fdef as shown in FIG. 2, four switching frequencies f of the frequency change pattern 25C are fc2+fdef+2Δf, fc2+3fdef+2Δf, 2fc2−fc1+fdef+2Δf, and 2fc2−fc1+3fdef+2Δf.

CISPR 25 established by CISPR prescribes a measurement condition in which the RBW of a spectrum analyzer is set to 9 kHz (6 dB) for a band equal to or lower than 30 MHz.

In general, setting of the RBW is realized by using a Gaussian filter. The Gaussian filter is implemented by convolution of an impulse response h(t) shown by the following expression (9) and sampled data of noise voltage.

[Mathematical 9]

$$h(t) = \frac{1}{\sqrt{2\pi}\sigma} e^{-\frac{t^2}{2\sigma^2}} \quad (9)$$

Here, t is time, and σ is a variable having a time dimension, for achieving an attenuation amount ATT [dB] at a specific RBW. A transfer function H(f) of the Gaussian filter shown in expression (9) is represented by the following expression (10).

[Mathematical 10]

$$H(f) = e^{-2(\pi\sigma f)^2} \quad (10)$$

When the RBW is fR [Hz], σ that achieves decrease by the attenuation amount ATT [dB] is calculated from the following expression (11), and solving the expression (11) for σ (>0) obtains the following expression (12).

[Mathematical 11]

$$20\log_{10}\left(e^{-2(\pi\sigma \cdot fR/2)^2}\right) = -ATT \text{ [dB]} \quad (11)$$

[Mathematical 12]

$$\sigma = \frac{1}{2\pi}\sqrt{\frac{2ATT}{5\log_{10}e}} \cdot \frac{1}{fR} \text{ [sec]} \quad (12)$$

Figure 16:
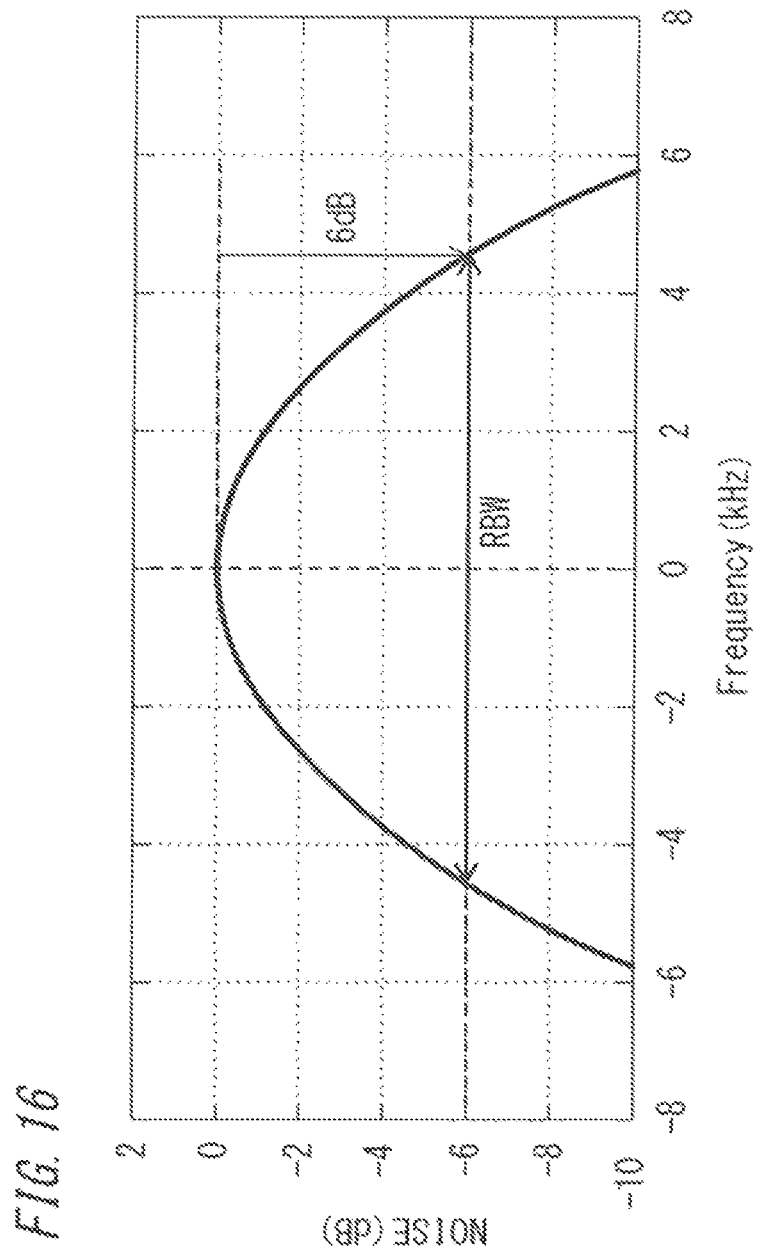
FIG. 16 shows frequency characteristics of a Gaussian filter for realizing a frequency resolution of a spectrum analyzer.

FIG. 16 is a graph showing frequency characteristics of a Gaussian filter for realizing the frequency resolution RBW of the spectrum analyzer under the condition that the RBW (=fR) is 9 [kHz] and the attenuation amount ATT is 6 [dB]. As shown in FIG. 16, the frequency characteristics are such that decrease by 6 dB occurs on one side separated by 4.5 kHz from the center frequency.

Figure 17:
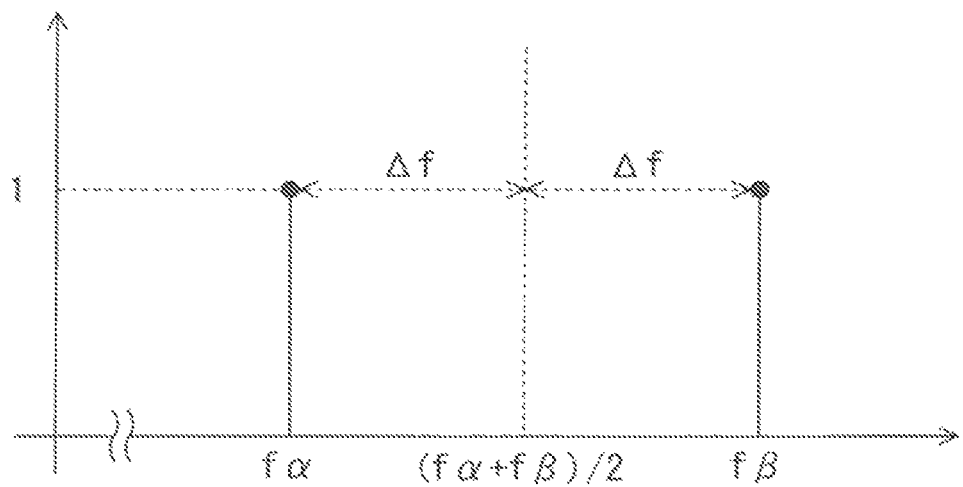
FIG. 17 is a conceptual diagram showing frequency characteristics of electromagnetic noise in the case of using two switching frequencies having a frequency difference therebetween, according to embodiment 5 of the present invention.

FIG. 17 is a conceptual diagram showing frequency characteristics of electromagnetic noise at two switching frequencies fα, fβ having a frequency difference 2Δf therebetween. In this case, the switching frequency fα is the greatest switching frequency in the frequency change pattern 25B used for the first power conversion circuit 10A, and the switching frequency fβ is the smallest switching frequency in the frequency change pattern 25C used for the second power conversion circuit 10B.

Figure 18:
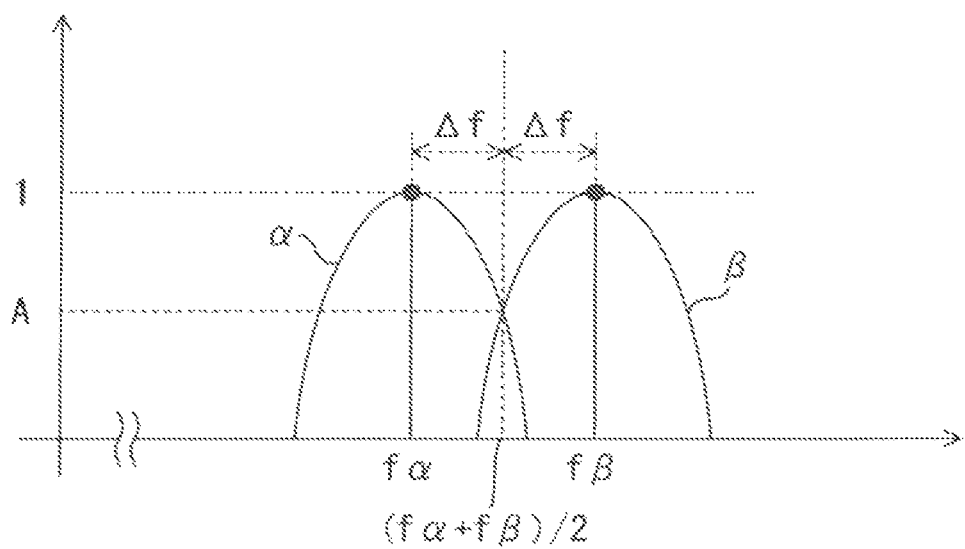
FIG. 18 is a conceptual diagram showing a result of measurement of frequency characteristics of electromagnetic noise in the case of using two switching frequencies having a frequency difference therebetween, according to embodiment 5 of the present invention.

FIG. 18 is a conceptual diagram showing a measurement result obtained by the spectrum analyzer measuring frequency characteristics of electromagnetic noise in the case of using two switching frequencies fα, fβ having a frequency difference 2Δf therebetween. As shown in FIG. 18, in measurement by the spectrum analyzer, in consideration of RBW, electromagnetic noise due to the switching frequency fα is represented by a waveform α, and electromagnetic noise due to the switching frequency fβ is represented by a waveform β.

As shown in FIG. 18, spectrum components of the switching frequencies fα, fβ interfere with each other, and in particular, at the center frequency (fα+fβ)/2, the two spectrum components are combined to increase electromagnetic noise. At this time, a combined wave at the center frequency (fα+fβ)/2 of the two switching frequencies fα, fβ is represented by the following expression (13).

In the expression (13), t is time [sec], θα and θβ are the phases [rad] of the respective frequency components (components of fα, fβ), fa (=(f±fβ)/2) is the center frequency, and Δf is difference between the center frequency fa and each frequency component.

Here, A is the amplitude of attenuation with respect to the center frequency fa by the RBW, and is represented by the following expression (14) on the basis of expression (10).

[Mathematical 13]

$$\begin{aligned}\text{Combined wave} &= A\,\cos(2\pi f\alpha t + \theta\alpha) + A\,\cos(2\pi f\beta t + \theta\beta) \\ &= 2A\cos\left(2\pi\frac{f\alpha+f\beta}{2}t + \frac{\theta\alpha+\theta\beta}{2}\right)\cdot\cos\left(2\pi\frac{f\alpha-f\beta}{2}t + \frac{\theta\alpha-\theta\beta}{2}\right) \\ &= 2A\cos\left(2\pi f\alpha t + \frac{\theta\alpha-\theta\beta}{2}\right)\cdot\cos\left(2\pi\Delta f t + \frac{\theta\alpha-\theta\beta}{2}\right)\end{aligned} \quad (13)$$

[Mathematical 14]

$$A = e^{-2(\pi\sigma\Delta f)^2} \quad (14)$$

Assuming Δf=0, expression (13) becomes expression (15), and the amplitude of the combined wave is represented by expression (16).

[Mathematical 15]

$$\text{Combined wave} = 2A\,\cos\left(2\pi f\alpha t + \frac{\theta\alpha+\theta\beta}{2}\right)\cos\left(\frac{\theta\alpha-\theta\beta}{2}\right) \quad (15)$$

[Mathematical 16]

$$\text{Amplitude} = 2A\,\cos\left(\frac{\theta\alpha-\theta\beta}{2}\right) \quad (16)$$

That is, in the case of Δf=0, the amplitude of the combined wave is maximized to 2 when θα=θβ is satisfied.

Figure 19:
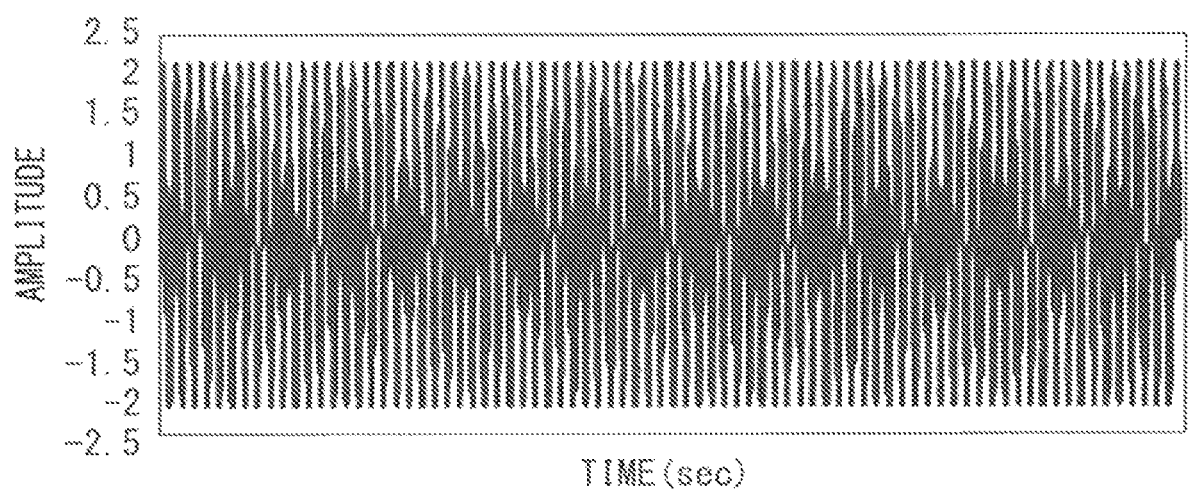
FIG. 19 shows a combined wave in the case where there is no frequency difference according to embodiment 5 of the present invention.

FIG. 19 is a conceptual diagram showing the combined wave at the center frequency fα of the two switching frequencies fα, fβ, in the case of, in particular, Δf=0 [kHz] and θα=θβ. If the envelope of the combined wave shown in FIG. 19 is detected, the maximum value and the average value of the envelope are both 2.

Figure 20:
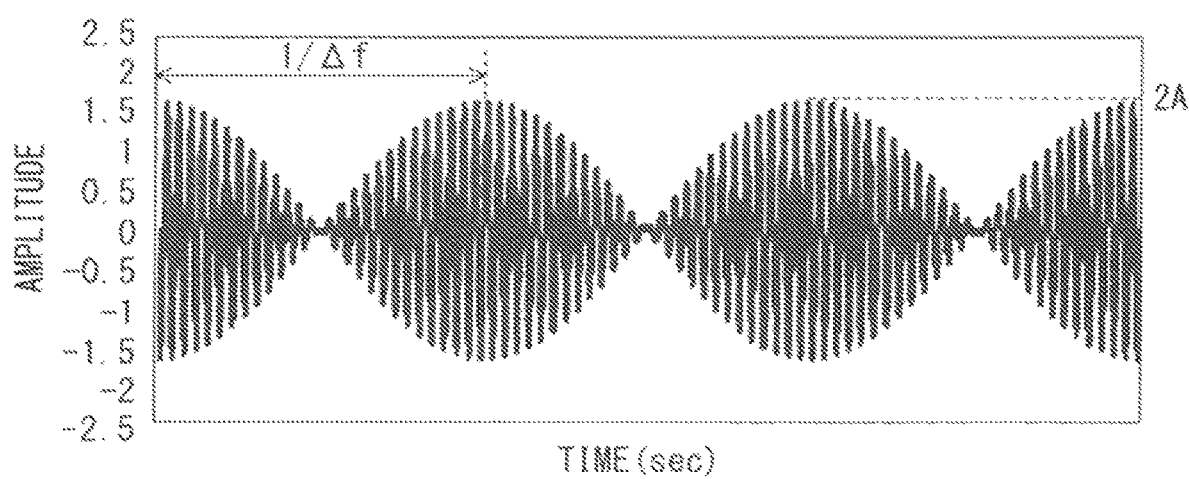
FIG. 20 shows a combined wave according to embodiment 5 of the present invention.

FIG. 20 is a conceptual diagram showing the combined wave at the center frequency fα in the case of Δf≠0, i.e., in the case where there is a frequency difference 2Δf between the two switching frequencies fα, fβp. As shown in FIG. 20, a beat occurs at 2Δf with respect to the center frequency fa. Therefore, a waveform obtained by detecting the envelope of the combined wave is represented by the following expression (17).

[Mathematical 17]

$$\text{Envelope} = 2 \, A \left| \cos\left(2\pi\Delta f t + \frac{\theta\alpha - \theta\beta}{2}\right) \right| \quad (17)$$

From expression (17), the maximum value and the average value of the envelope are represented by the following expression (18).

[Mathematical 18]

$$\text{Maximum value} = 2 \, A = e^{-2(\pi\sigma\Delta f)^2} \quad (18)$$

$$\text{Average value} = \int_0^{\frac{1}{\Delta f}} 2 \, A \left|\cos\left(2\pi\Delta f t + \frac{\theta\alpha - \theta\beta}{2}\right)\right| dt = \frac{4}{\pi} A$$

In the maximum value 2A of the envelope, the center frequency component of m-order harmonic components of the switching frequencies becomes smaller by ATT [dB] than the maximum value (=2) in the case of Δf=0, when the following expression (19) is satisfied.

[Mathematical 19]

$$20 \log_{10} e^{-2(m\pi\sigma\Delta f)^2} = -ATT \quad (19)$$

Solving expression (19) for Δf (>0) obtains the following expression (20).

[Mathematical 20]

$$\Delta f = \frac{1}{m\pi\sigma} \sqrt{\frac{ATT}{40\log_{10} e}} \quad (20)$$

Similarly, in the average value of the envelope, the center frequency component of m-order harmonic components of the switching frequencies becomes smaller by ATT [dB] than the maximum value (=2) in the case of if =0, when the following expression (21) is satisfied.

[Mathematical 21]

$$20\log_{10} \frac{2e^{-2(m\pi\sigma\Delta f)^2}}{\pi} = -ATT \quad (21)$$

Solving expression (20) for Δf (>0) obtains the following expression (22).

[Mathematical 22]

$$\Delta f = \frac{1}{m\pi\sigma} \sqrt{\frac{ATT + 20\log_{10}(2/\pi)}{40\log_{10} e}} \quad (22)$$

In order to obtain an optional attenuation amount ATT with respect to the maximum value and the average value of the center frequency component of m-order harmonic components of the switching frequencies, Δf in the frequency difference 2Δf may be determined by using the above expression (20) and expression (22). That is, by using the above expression (20) and expression (22), the frequency difference 2Δf is determined in accordance with a desired attenuation amount ATT for harmonic components of a decrease target order number m.

As described above, in the present embodiment, in switching control of the two first and second power conversion circuits 10A, 10B using the respective frequency change patterns 25B, 25C, the smallest switching frequency in the frequency change pattern 25C is set to be greater by the frequency difference 2Δf than the greatest switching frequency in the frequency change pattern 25B. Spectrums of electromagnetic noise occurring due to switching operations of the two first and second power conversion circuits 10A, 10B interfere with each other to increase the electromagnetic noise. However, by setting the switching frequencies as described above, increase in electromagnetic noise due to interference can be suppressed. It is noted that the first and second power conversion circuits 10A, 10B have the same configuration and operate in the same manner as the power conversion circuit 10 in the above embodiment 4, and therefore the noise decreasing effect is obtained as in the above embodiment 4.

In addition, since the frequency difference 2Δf is determined in accordance with a desired attenuation amount ATT for harmonic components of a decrease target order number m, the frequency difference 2Δf is not increased more than necessary, that is, increase in the entire variation width of the switching frequencies is suppressed, and thus electromagnetic noise can be effectively decreased.

Embodiment 6

Figure 21:
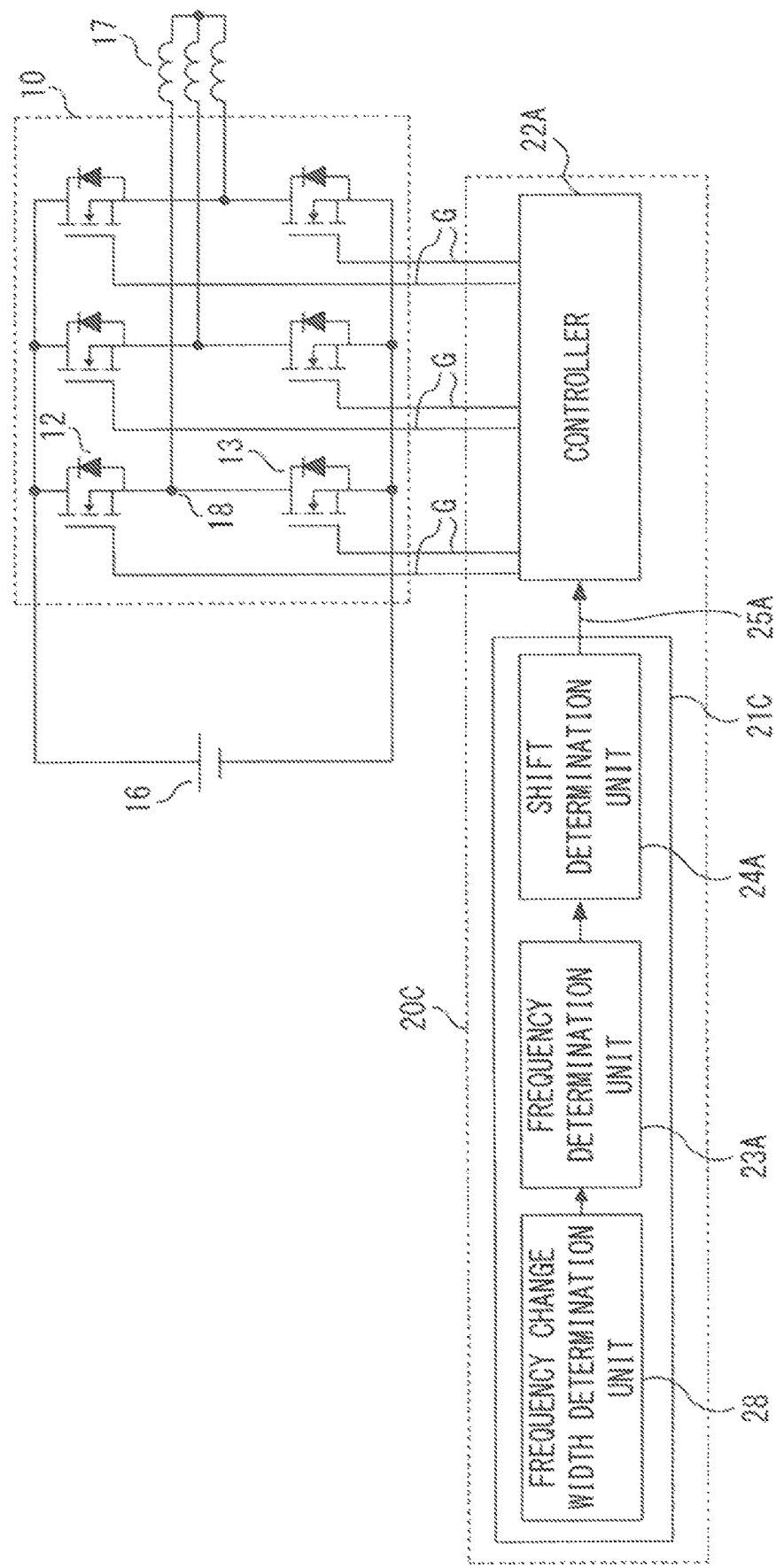
FIG. 21 is a diagram showing the configuration of a power conversion device according to embodiment 6 of the present invention.

Next, a power conversion device according to embodiment 6 of the present invention will be described. FIG. 21 is a configuration diagram of the power conversion device according to embodiment 6 of the present invention.

As shown in FIG. 21, the power conversion device includes: a power conversion circuit 10 composed of a three-phase inverter circuit connected between a DC power supply 16 and a three-phase load 17; and a control device 20C. The power conversion circuit 10 is the same as that in the above embodiment 4.

The control device 200 includes a pattern generation unit 21C which generates a frequency change pattern 25A, and a controller 22A which generates a control signal G for switching each switching element 12, 13 in accordance with the frequency change pattern 25A, thereby performing switching control of the switching elements 12, 13 in the power conversion circuit 10. The pattern generation unit 21C includes a frequency change width determination unit 28, a frequency determination unit 23A which determines 2n switching frequencies f, and a shift determination unit 24A which determines the shift order for the determined switching frequencies f and generates the frequency change pattern 25A. The frequency determination unit 23A, the shift determination unit 24A, and the controller 22A have the same configurations as those in the above embodiment 4 and operate in the same manner.

The frequency change width determination unit 28 determines a change width fvar of 2n switching frequencies f with respect to a middle value fmid. The 2n switching frequencies f are determined within a range of ±fvar with respect to the middle value fmid, and in this case, the minimum value is fmid−fvar and the maximum value is fmid+fvar. It is noted that the middle value fmid is determined by constraints due to heat generation and current ripple in the power conversion circuit 10, and the like. Determination of the change width fvar by the frequency change width determination unit 28 is performed as follows. The frequency change width determination unit 28 has a table in which a noise decrease amount for each harmonic order number based on the middle value fmid and the change width fvar of the switching frequencies f is set in advance. For harmonic components of a decrease target order number, the change width fvar corresponding to a desired noise decrease amount is determined with reference to the table.

FIG. 22 is a waveform diagram showing a noise decrease amount for each harmonic order number (ninth order, thirteenth order, seventeenth order) based on the middle value fmid and the change width fvar of the switching frequencies f, and the table in the frequency change width determination unit 28 is based on data of this waveform diagram. FIG. 22 shows the relationship between the change width fvar with respect to each middle value fmid (9 kHz, 12 kHz, 15 kHz, 18 kHz), and a ninth-order harmonic component ha, a thirteenth-order harmonic component hb, and a seventeenth-order harmonic component hc.

For example, in the case where the middle value fmid is 12 kHz, if the ninth-order harmonic component ha is to be decreased by 6 [dB], the change width fvar is determined so as to satisfy $(2 \times fvar \times 9 / fcmid) \times 100 = 200$ (see FIG. 22(b)).

The frequency determination unit 23A determines 2n switching frequencies f using n first frequencies fc and a second frequency fdef smaller than the smallest one of differences between the n first frequencies fc so that the minimum value is fmid−fvar and the maximum value is fmid+fvar. The shift determination unit 24A generates the frequency change pattern 25A in which the switching frequencies f are each used for predetermined duration cycles (different duration time) in such a shift order that the middle value between two switching frequencies f before and after shifting does not overlap the value of each switching frequency f. Then, for each phase, the controller 22A generates a control signal G for each switching element 12, 13 through comparison between a command value and a carrier wave based on the frequency change pattern 25A.

Thus, as in the above embodiment 4, concentration of peaks in a spectrum of electromagnetic noise is avoided and the spectrum of electromagnetic noise is spread, whereby a noise decreasing effect by peak dispersion is obtained.

In addition, for harmonic components of a decrease target order number, the change width fvar corresponding to a desired noise decrease amount is determined, to determine 2n switching frequencies f. Thus, the change width fvar is not increased more than necessary, that is, increase in the variation width of the switching frequency f is suppressed, whereby electromagnetic noise can be effectively decreased. In addition, since the change width fvar can be set to be small with respect to a desired noise decrease amount, cost increase of the microcomputer and increase in switching loss due to increased frequency can be suppressed. That is, cost reduction and loss reduction can be achieved.

Further, the frequency change width determination unit 28 has a table in which a noise decrease amount for each harmonic order number based on the middle value fmid and the change width fvar of the switching frequencies f is set in advance, and thereby determines the change width fvar. Thus, the change width fvar can be easily determined.

Figure 23:
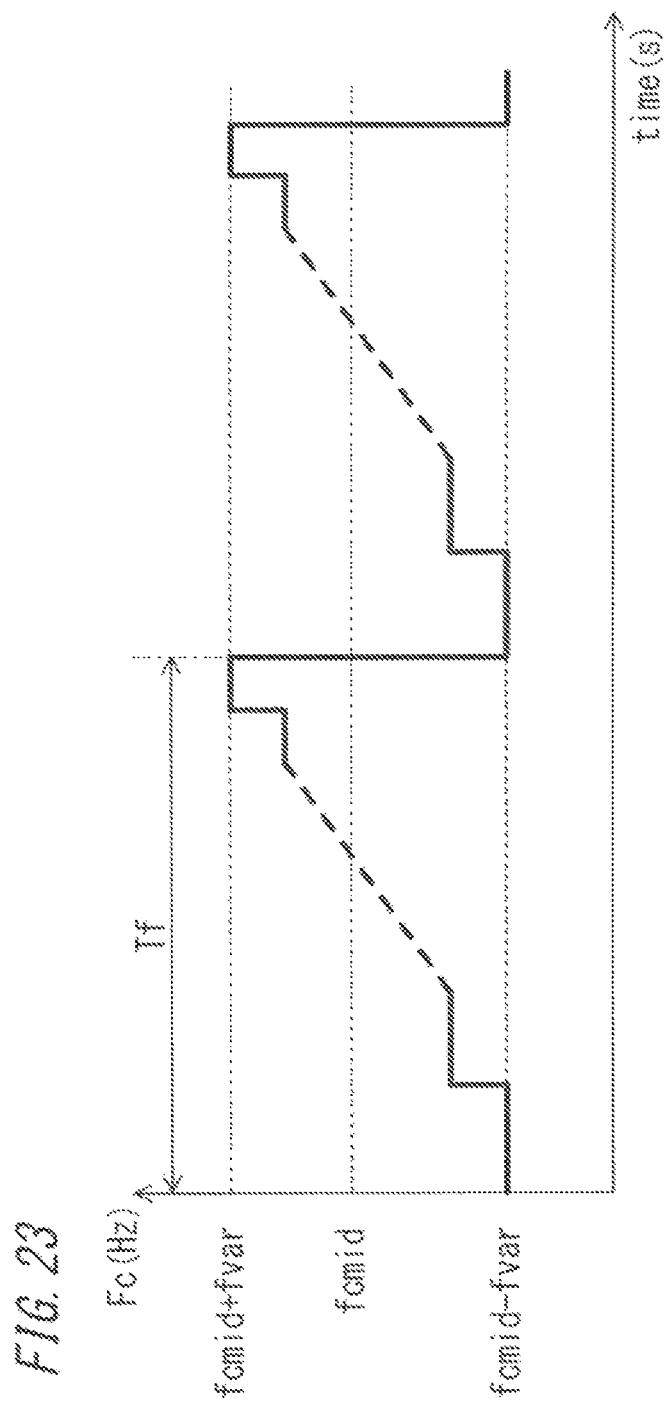
FIG. 23 shows change in a switching frequency in an application example of embodiment 6 of the present invention.

It is noted that the method of determining the change width fvar corresponding to a desired noise decrease amount for harmonic components of a decrease target order number and determining a plurality of switching frequencies f is also applicable to another frequency determination unit and another shift determination unit. For example, this method is also applicable to the case where the shift order of the plurality of switching frequencies Fc is an increasing order of the switching frequencies Fc as shown in FIG. 23. Also in this case, the change width fvar is not increased more than necessary, that is, increase in the variation width of the switching frequency Fc is suppressed, and thus electromagnetic noise can be effectively decreased.

It is noted that, within the scope of the present invention, the above embodiments may be freely combined with each other, or each of the above embodiments may be modified or simplified as appropriate.

The invention claimed is:

1. A power conversion device comprising:
   a power conversion circuit which has a switching element and which performs power conversion of input power through switching operation of the switching element and outputs resultant power; and
   a control device for controlling the power conversion circuit, wherein
   the control device includes
     a pattern generation unit for generating a frequency change pattern in which 2n switching frequencies f are shifted thereamong, n being an integer equal to or greater than 2, and
     a controller for generating a control signal for switching the switching element, by using the 2n switching frequencies f for respective different duration times in accordance with the generated frequency change pattern,
   the pattern generation unit includes
     a frequency determination unit which, using n first frequencies fc and a second frequency fdef smaller than a smallest one of differences among the n first frequencies fc, determines the 2n switching frequencies f which are generated by adding/subtracting the second frequency fdef to/from each first frequency fc so as to sandwich the first frequency fc, and
     a shift determination unit which determines a shift order of the 2n switching frequencies f so that a middle value between two switching frequencies f before and after shifting does not overlap a value of each switching frequency f, and
   the controller uses a carrier wave having each switching frequency f as a carrier frequency and changes each carrier frequency in synchronization with upper peaks or lower peaks of the carrier wave.

2. The power conversion device according to claim 1, wherein
   the controller continuously uses at least one of the 2n switching frequencies f for two or more cycles.

3. The power conversion device according to claim 2, wherein
   the controller continuously uses every switching frequency of the 2n switching frequencies f for two or more cycles.

4. The power conversion device according to claim 2, wherein
the second frequencies fdef to be added/subtracted to/from the first frequencies fc are the same frequency.

5. The power conversion device according to claim 4, wherein
the second frequency fdef is determined on the basis of (1/(m·Tf)) calculated from a cycle Tf of a pattern in which the 2n switching frequencies f are continued for the respective duration times and an order number m of a decrease target among harmonic components of the switching frequencies f.

6. The power conversion device according to claim 4, wherein
the 2n switching frequencies f are continued for the duration times that correspond to the same number λ of cycles, and the second frequency fdef is determined on the basis of (1/(2m·Tfc)) calculated from a cycle Tfc of a pattern in which the n first frequencies fc are each continued for the number λ of cycles and an order number m of a decrease target among harmonic components of the switching frequencies f.

7. The power conversion device according to claim 1, wherein
in a case where the first frequencies fc when n is 2 are defined as fc1 and fc2, the shift order of the 2n switching frequencies f to be repeated is a forward or reverse order of fc2+fdef, fc1−fdef, fc2−fdef, fc1+fdef.

8. The power conversion device according to claim 1, wherein
in a case where the first frequencies fc when n is 3 or more is defined as fc(k), k being an integer from 1 to n, the shift order of the 2n switching frequencies f to be repeated is a forward or reverse order that satisfies an order of fc(n)−fdef, fc(n−1)+fdef, fc(n)+fdef, fc(1)−fdef, fc(2)−fdef, and that satisfies, for k being 1 to n−2, an order of fc(k+1)−fdef, fc(k)+fdef, fc(k+2)−fdef.

9. The power conversion device according to claim 1, wherein
the pattern generation unit generates the frequency change pattern in which the 2n switching frequencies f are used for the respective different duration times and shifted in the shift order.

10. The power conversion device according to claim 1, wherein
the pattern generation unit generates the frequency change pattern in which the 2n switching frequencies f are shifted in the shift order, and
the controller generates the control signal with a control cycle that is an equal period to the duration time for each carrier frequency.

11. The power conversion device according to claim 1, wherein
a reciprocal of a cycle Tf of a pattern in which the 2n switching frequencies f are continued for the respective duration times is equal to or greater than a resolution bandwidth of a spectrum analyzer for measuring a spectrum of switching noise.

12. The power conversion device according to claim 1, wherein
the pattern generation unit has a table that indicates a correspondence relationship between a change width of the switching frequencies in the frequency change pattern and a decrease amount for a harmonic component, and
the pattern generation unit determines the change width corresponding to a desired decrease amount for a harmonic component of a decrease target order number, using the table, and generates the frequency change pattern in accordance with the determined change width.

13. The power conversion device according to claim 1, wherein
the power conversion circuit includes a first power conversion circuit and a second power conversion circuit arranged in parallel,
the control device controls the first and second power conversion circuits by generating, as the frequency change pattern, a first pattern and a second pattern, respectively, and
a smallest switching frequency f in the second pattern is greater than a greatest switching frequency f in the first pattern.

14. The power conversion device according to claim 13, wherein
a frequency difference between the smallest switching frequency f in the second pattern and the greatest switching frequency f in the first pattern is determined in accordance with a desired attenuation amount for a harmonic component of a decrease target order number.

15. The power conversion device according to claim 1, wherein
the second frequencies fdef to be added/subtracted to/from the first frequencies fc are the same frequency.

16. The power conversion device according to claim 15, wherein
the second frequency fdef is determined on the basis of (1/(m·Tf)) calculated from a cycle Tf of a pattern in which the 2n switching frequencies f are continued for the respective duration times and an order number m of a decrease target among harmonic components of the switching frequencies f.

17. The power conversion device according to claim 15, wherein
the 2n switching frequencies f are continued for the duration times that correspond to the same number λ of cycles, and the second frequency fdef is determined on the basis of (1/(2m·Tfc)) calculated from a cycle Tfc of a pattern in which the n first frequencies fc are each continued for the number λ of cycles and an order number m of a decrease target among harmonic components of the switching frequencies f.

18. The power conversion device according to claim 15, wherein
the pattern generation unit generates the frequency change pattern in which the 2n switching frequencies f are used for the respective different duration times and shifted in the shift order.

19. The power conversion device according to claim 15, wherein
the pattern generation unit generates the frequency change pattern in which the 2n switching frequencies f are shifted in the shift order, and
the controller generates the control signal with a control cycle that is an equal period to the duration time for each carrier frequency.

20. The power conversion device according to claim 15, wherein
a reciprocal of a cycle Tf of a pattern in which the 2n switching frequencies f are continued for the respective duration times is equal to or greater than a resolution bandwidth of a spectrum analyzer for measuring a spectrum of switching noise.

* * * * *